(12) United States Patent
Peck et al.

(10) Patent No.: US 7,836,426 B2
(45) Date of Patent: *Nov. 16, 2010

(54) AUTOMATIC GENERATION OF APPLICATION DOMAIN SPECIFIC GRAPHICAL PROGRAMS

(75) Inventors: Joseph E. Peck, Hutto, TX (US); Matthew E. Novacek, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1281 days.

This patent is subject to a terminal disclaimer.

(21) Appl. No.: 11/349,465

(22) Filed: Feb. 7, 2006

(65) Prior Publication Data

US 2006/0225034 A1    Oct. 5, 2006

Related U.S. Application Data

(63) Continuation-in-part of application No. 10/839,862, filed on May 6, 2004, now Pat. No. 7,743,362.

(51) Int. Cl.
*G06F 9/44* (2006.01)
*G01G 23/01* (2006.01)
*G01M 19/00* (2006.01)

(52) U.S. Cl. .............. 717/109; 717/104; 717/105; 717/106; 702/188; 702/123

(58) Field of Classification Search .............. None
See application file for complete search history.

(56) References Cited

U.S. PATENT DOCUMENTS 4,831,580 A  5/1989  Yamada
4,901,221 A * 2/1990  Kodosky et al. ............ 715/771

(Continued)

FOREIGN PATENT DOCUMENTS

EP    1077404    2/2001

OTHER PUBLICATIONS

Optilab Image Processing and Analysis Software for the Apple Macintosh™ II, User's Manual, dated 1990.

(Continued)

*Primary Examiner*—Michael J Yigdall
*Assistant Examiner*—Hanh T Bui
(74) *Attorney, Agent, or Firm*—Meyertons Hood Kivlin Kowert & Goetzel, P.C.; Jeffrey C. Hood; Joel L. Stevens

(57) ABSTRACT

System and method for generating an application domain specific graphical program. A graphical user interface (GUI) for specifying functionality of a graphical program in an application domain is displayed, where the GUI corresponds specifically to the application domain. User input to the GUI specifying the functionality of the graphical program is received, and the graphical program generated in response, where the graphical program is executable to perform the specified functionality, and comprises multiple interconnected graphical program nodes that visually represent the graphical program functionality. The GUI includes graphical interface elements operable to indicate and/or specify, e.g., via user input, respective attributes of the graphical program such as timing, triggering, analog and/or digital input/output (I/O), resource allocation, processing option, inclusion of one or more external files, and one or more target devices, among others, and may determine the graphical interface elements based on the specified one or more target devices.

32 Claims, 12 Drawing Sheets

U.S. PATENT DOCUMENTS

| | | | |
|---|---|---|---|
| 5,481,712 A * | 1/1996 | Silver et al. ............... | 717/109 |
| 5,481,741 A | 1/1996 | McKaskle et al. | |
| 5,576,946 A | 11/1996 | Bender et al. | |
| 5,742,504 A * | 4/1998 | Meyer et al. ............... | 700/83 |
| 5,862,372 A | 1/1999 | Morris et al. | |
| 5,911,070 A | 6/1999 | Solton et al. | |
| 5,940,296 A | 8/1999 | Meyer | |
| 5,966,532 A * | 10/1999 | McDonald et al. .......... | 717/105 |
| 6,053,951 A | 4/2000 | McDonald et al. | |
| 6,173,438 B1 * | 1/2001 | Kodosky et al. ............ | 717/109 |
| 6,219,628 B1 * | 4/2001 | Kodosky et al. ............ | 703/2 |
| 6,366,300 B1 | 4/2002 | Ohara et al. | |
| 6,425,120 B1 * | 7/2002 | Morganelli et al. ......... | 717/109 |
| 6,437,805 B1 * | 8/2002 | Sojoodi et al. ............. | 715/763 |
| 6,453,464 B1 | 9/2002 | Sullivan et al. | |
| 6,701,513 B1 * | 3/2004 | Bailey ....................... | 717/109 |
| 6,823,283 B2 * | 11/2004 | Steger et al. ............... | 702/127 |
| 6,880,130 B2 * | 4/2005 | Makowski et al. .......... | 715/763 |
| 6,889,172 B2 * | 5/2005 | Sierer et al. ................ | 702/188 |
| 7,085,670 B2 * | 8/2006 | Odom et al. ................ | 702/127 |
| 7,526,535 B2 * | 4/2009 | Peck et al. .................. | 709/220 |
| 7,536,269 B2 * | 5/2009 | Sierer et al. ................ | 702/123 |
| 7,603,652 B2 * | 10/2009 | Makowski et al. .......... | 717/105 |
| 7,630,854 B2 * | 12/2009 | Sierer et al. ................ | 702/127 |
| 2001/0020291 A1 * | 9/2001 | Kudukoli et al. ............ | 717/1 |
| 2001/0024211 A1 * | 9/2001 | Kudukoli et al. ............ | 345/763 |
| 2001/0034879 A1 * | 10/2001 | Washington et al. ........ | 717/1 |
| 2001/0035879 A1 * | 11/2001 | Washington et al. ........ | 345/763 |
| 2002/0083413 A1 * | 6/2002 | Kodosky et al. ............ | 717/109 |
| 2002/0089538 A1 * | 7/2002 | Wenzel et al. ............... | 345/763 |
| 2002/0129333 A1 * | 9/2002 | Chandhoke et al. ......... | 717/107 |
| 2003/0036875 A1 * | 2/2003 | Peck et al. .................. | 702/127 |
| 2003/0038842 A1 * | 2/2003 | Peck et al. .................. | 345/763 |
| 2003/0107599 A1 * | 6/2003 | Fuller et al. ................. | 345/763 |
| 2003/0163298 A1 * | 8/2003 | Odom et al. ................ | 703/21 |
| 2004/0034696 A1 * | 2/2004 | Joffrain et al. .............. | 709/217 |
| 2004/0034847 A1 * | 2/2004 | Joffrain et al. .............. | 717/113 |
| 2005/0028138 A1 | 2/2005 | Case et al. | |
| 2005/0091602 A1 * | 4/2005 | Ramamoorthy et al. ..... | 715/763 |
| 2005/0177816 A1 * | 8/2005 | Kudukoli et al. ............ | 717/105 |
| 2009/0183140 A9 * | 7/2009 | Peck et al. .................. | 717/113 |

OTHER PUBLICATIONS

MacUser, John Rizzo, Image Analyst and Enhance, Jul. 1990, pp. 55-58.

SPIE—The International Society for Optical Engineering, Steven Rosenthal and Larry Stahlberg, "Integrated Approach to Machine Vision Application Development", vol. 1386, Nov. 8, 1990, pp. 158-162.

Automatix News Release, www.applefritter.com/macclones/automatix/newsrelease, Vision for Process Feedback and Control, Jul. 3, 2000, pp. 1-3.

IPLab, Serious Image Processing for the Macintosh II, 1990.

SPIE—The International Society for Optical Engineering, Michael S. Mort and Robert J. Fontana, "Low Cost Image Analysis Workstation Which is Menu Driven and Extensible," vol. 1232, Feb. 4, 1990, pp. 380-389.

IPLab™, User's Guide, Signal Analytics Corporation, 1991.

MacGuide Magazine, vol. 2, Issue 4, Stuart Gitlow, M.D., "X-Ray Vision," Jun. 1989, pp. 89-94.

Ric Ford, Optimage Processes Scientific Images, 1994.

Signal Analytics Corp., News Release, "Signal Analytics Brings Powerful Scientific Image Processing to the Macintosh II", Feb. 1, 1990 (2 pgs.).

U.S. Appl. No. 09/518,492, filed Mar. 3, 2000, Kudukoli et al.

U.S. Appl. No. 09/595,003, filed Jun. 13, 2000, Vasquez et al.

IPLab, "Serious Scientific Image Processing for the Macintosh II", 1992 (4 pgs.).

IPLab, "Gives You Unparalleled Value", 1992, (6 pgs.).

Signal Analytics Corp., "IPLab Brings Affordable Scientific Image Processing to the Macintosh II", estimated 1990 (2 pgs.).

Automatix Inc., "A Seminar on Machine Vision & Image Analysis", 1993, (46 pgs.).

National Instruments, Measurement and Automation Catalogue, Interactive Vision Software, 1999, pp. 518-520.

MacUser, "Ultimage and IPLab Spectrum", Jul. 1991, (5 pgs.).

Eva Magnusson, Lund University, "State diagram Generation" term paper in the graduate course Attribute Grammars, Spring 1999, 21 pages.

Simona Vasilache and Jiro Tanaka, University of Tsukuba, Japan "Translating OMT State Diagrams with Concurrency into SDL Diagrams", 6 pages plus cover page, Aug. 28-31, 2000.

The MathWorks, User's Guide, Stateflow © 1997-2001, 6 pages.

"IMAQ Vision Builder Tutorial," National Instruments, Jan. 1999.

Advanced Imaging, Special Report: Imaging and the Macintosh/Robust Image Databases, Apr. 1991, pp. 18-32.

Stateflow User's Guide, Version 4, The Math Works, Inc., Copyright 1997-2001.

Hunt, Niel, IDF: A graphical dataflow programming language for image processing and computer vision, p. 351-360, IEEE 1990 retrieved from the IEEE database Jan. 7, 2003.

Keddy, W.A., Agathoklis, P., "DEDIP: A User-friendly environment for digital image processing algorithm development", p. 733-736, IEEE 1991, retrieved from the IEEE database Jan. 7, 2003.

Konstantinides, Konstantinos et al., The Khoros Software Development Environment for Image and Signal Processing, p. 1-14, 1992, retrieved from http:/www.hpl.hp.com/techreports/92/HPL-92-96.pdf on Jan. 7, 2003.

Sim, Young-Seok et al., "Design and Implementation of the Visual Programming Environment for the Distributed Image Processing," p. 149-152, IEEE 1996, retrived from IEEE database Jan. 7, 2003.

SILMA Products—Production PILOT from internet site "www.adept.com/Silma/products/pd-productionpilot.html," May 24, 2001, 4 pages.

Newtonium, RoboWorks from Internet site www.newtonium.com/public_html/Products/RoboWorks/RoboWorks.htm, Mar. 30, 2002, 3 pages.

National Instruments "The Measurement and Automation Catalog 2002" pp. 97 and 580-594.

Computor Motion Architect User Guide, Aug. 1994, 23 pages.

GE Fanuc Automation "Software Solutions" 2002, 8 pages.

GE Industrial Systems CIMPLICITY Machine Edition—Motion Developer, Drawings, Dec. 6, 2001, 4 pages.

GE Fanuc Automation CIMPLICITY Machine Edition, © 2000, 4 pages.

Servo Catalogue "Motion Builder: Making Motion Control Programming Easy", undated, pp. 86-87.

GE Industrial Systems CIMPLICTY Machine Edition—Motion Developer, Product Information, 2002, 2 pages.

\* cited by examiner

Timing Structure

Analog Input

Analog Output

Timer

Interrupt

AUTOMATIC GENERATION OF APPLICATION DOMAIN SPECIFIC GRAPHICAL PROGRAMS

CONTINUATION DATA

This application is a Continuation-In-Part of U.S. patent application Ser. No. 10/839,862 titled "Programmatic Generation of Application Domain Specific Graphical Programs" filed May 6, 2004 now U.S. Pat. No. 7,743,362, whose inventors are Joseph E. Peck and Matthew E. Novacek.

FIELD OF THE INVENTION

The present invention relates to the field of graphical programming, and more particularly to a system and method of use for an application domain specific tool for specifying desired program functionality for a graphical program in the application domain, and programmatically generating graphical source code implementing the specified functionality.

DESCRIPTION OF THE RELATED ART

Traditionally, high level text-based programming languages have been used by programmers in writing application programs. Many different high level text-based programming languages exist, including BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW™ product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

As graphical programming environments have matured and grown in popularity and complexity, it has become increasingly desirable to provide high-level tools which help a user create a graphical program. It also becomes increasingly desirable to integrate graphical programming environments with other applications and programming environments. In order to provide the desired tools or the desired integration, it would be greatly desirable to provide the ability to dynamically or programmatically generate a graphical program or a portion of a graphical program. For example, for various applications, it would be desirable to provide various types of program information to a program, wherein the program information specifies functionality of a graphical program (or portion of a graphical program) to be programmatically generated.

As described above, a user typically creates a graphical program within a graphical programming environment by interactively or manually placing icons or nodes representing the desired blocks of functionality on a diagram, and connecting the icons/nodes together to represent one or more of the data flow, control flow, and/or execution flow of the program. The ability to programmatically generate a graphical program in response to program information would enable a graphical program or graphical program portion to automatically be generated without this type of interactive user input. For example, it would be desirable for the user to be able to specify program functionality at a high level via one or more graphical user interface (GUI) panels, and to then programmatically generate a graphical program or graphical program portion implementing the specified program functionality, where the graphical program may be targeted for various target platforms, such as FPGAs, embedded devices, and general purpose computer systems, among others.

SUMMARY OF THE INVENTION

Various embodiments of a tool, e.g., an application assistant, are described that may be used to specify or otherwise define the organization of features in an application, i.e., in a graphical program. In a preferred embodiment, an application assistant may be designed to build block diagrams for a specific class of applications, such as control loops, timer/counters, I/O, signal generation, etc. The creator of the assistant preferably has domain knowledge about the individual features and how they relate to one another for this class of applications. Therefore the assistant preferably knows which features are defined as input resources and which are defined as output resources so that they may be placed correctly in the block diagram. In one embodiment, a simple assistant may provide the ability to configure timing, triggering, and I/O features. In more advanced embodiments, extensions to this basic functionality may include advanced I/O types, embedded processing, and inclusion of user created features, resource allocation, processing options, inclusion of external files, and target devices for the graphical program, among others. Further details of an example application assistant and its use are provided below.

The method described below is preferably performed by an application assistant (or equivalent) that includes a GUI for displaying information to a user and for receiving input from the user, e.g., via a plurality of fields, sections, or panels displayed on a computer monitor. The method below is described with respect to a control loop application, where, for example, a first portion of the application is targeted for execution on a programmable hardware element, such as an FPGA, and a second portion of the application is targeted for execution on a host computer system, where the first and second portions execute in a coordinated manner to perform the application domain specific functionality, e.g., the control loop. However, it should be noted that this is but one example of an application assistant, and that other types of application assistants (or equivalent) are also contemplated for any application domain desired. Application domains contemplated include, but are not limited to, control loops, timer/counters, data acquisition, machine vision, and so forth. Note that the specificity of the various domains contemplated may vary widely, and that domains may also be hierarchical.

For example, at a high level, control usually refers to maintaining a system at a setpoint through the use of command outputs and feedback inputs. An application assistant may be created that deals with this domain at a fairly simple and general level. For example, in one embodiment, the assistant may provide or facilitate a single timed loop, and may allow the user to specify the inputs to be sampled and the outputs to be driven, where, for example, all of the processing occurs in the host. This example assistant may be used for many types of control applications.

However, there are many sub-domains that may benefit from more specific application assistants. These more specific application assistants (e.g., control assistants) may offer options that are tuned or correspond to the more narrow domains. For example, consider a servo motor positioning controller. This type of controller operates to rotate a motor in a controlled fashion from one position to another. The system typically includes forward and reverse limit switches used to indicate the end of travel, and implemented as digital inputs. Instead of just presenting generic digital I/O, the assistant may ask which lines are specifically to be used as limit switches. The feedback mechanism for the majority of servo motor applications is some form of quadrature encoder. Although the assistant may present other options for feedback, in some embodiments, it may offer a richer set of quadrature interfaces than the generic assistant might, and may offer the quadrature interface as the default selection.

Thus, in various embodiments, application assistants may be provided for any domain or sub-domain desired, including, for example, control, e.g., control loops, motion control, etc., timer/counters; measurement, e.g., data acquisition, waveform generation, etc., data analysis, e.g., pattern matching, image and/or signal processing, etc., machine vision, hardware in the loop simulation, simulation, and embedded systems, among others. Note that these application domains and sub-domains are meant to be exemplary only, and are not intended to limit the fields, domains, or sub-domains, to which application assistants may be directed.

An application domain specific graphical user interface (GUI) may be displayed for specifying functionality of a graphical program in an application domain, wherein the GUI corresponds specifically to the application domain, and preferably includes a plurality of graphical interface elements, e.g., controls and/or indicators, operable to specify and/or indicate respective attributes of the graphical program.

User input may be received to the GUI, e.g., via a pointing device, keyboard, voice, and/or any other type of user interface means, to the GUI, e.g., by manipulating controls, entering alphanumeric data, etc., to specify desired functionality or otherwise configure the application as desired. For example, the user input to the GUI may specify such aspects of the graphical program as timing, triggering, analog input/output (I/O), digital I/O, resource allocation, mathematical algorithms and/or other processing, one or more target devices, and/or inclusion of one or more external files in the graphical program, e.g., user created subVIs or third party programs, among others.

In one embodiment, the GUI may be dynamic with respect to the user input (or with respect to input from other sources). For example, in an embodiment where the user input to the GUI specifies one or more target devices for the graphical program, the plurality of graphical interface elements (comprised in and displayed by the GUI) may be determined based on the specified one or more target devices for the graphical program, where the plurality of graphical interface elements correspond to respective attributes of the graphical program appropriate to the one or more target devices. In other words, if the specified target device (or devices) has no digital resources, i.e., no digital lines, then the GUI may not include graphical interface elements for specifying digital resources.

In another embodiment, once the user has specified the functionality of the graphical program, the application assistant may determine one or more suitable target devices for the graphical program based on the specified functionality, and the GUI may indicate the one or more suitable target devices, e.g., via a list box or other means. User input may then be received selecting at least a subset of the one or more suitable target devices for deployment and execution of the graphical program. In other words, the assistant may be operable to restrict the possible target devices presented to the user to those capable of supporting the specified functionality. Thus, if digital resources are specified by the user, the GUI preferably presents target devices for selection that include such digital resources.

In one embodiment, at least a portion of the graphical program is targeted for execution on a programmable hardware element. The GUI may be operable to display an estimated utilization of the programmable hardware element by the graphical program.

Then, the graphical program may be programmatically or automatically generated in response to the user input. The graphical program comprises a plurality of interconnected graphical program nodes that visually represents the functionality of the graphical program, and is executable to perform the specified functionality. In one embodiment, the assistant may generate both the FPGA diagram intended for the hardware and the RT diagram targeting the processor. Thus, in this example control application, the generated graphical program is a distributed graphical program comprising a first portion and a second portion, where the first portion is targeted for execution on a first device, and where the second portion is targeted for execution on a second device, and where the first portion and the second portion are respectively executable on the first device and the second device to perform the specified functionality in a cooperative manner.

In various embodiments, the graphical program code may be generated using any of various methods or techniques. For example, the application assistant may analyze the inputs provided by the user and determine appropriate graphical program elements corresponding to the specified functionality, and may configure the determined graphical program elements accordingly, including setting values of one or more parameters and interconnecting ("wiring") the graphical program elements to implement the correct input/output relationships between them. In other embodiments, in generating the graphical program, the application assistant may generate one or more intermediate structures, e.g., data structures or files. For example, the application assistant may analyze the user input, generate one or more data structures based on the analysis, and generate the graphical program based on the one or more data structures. As another example, the application assistant may generate a program specification based on the user input, then parse and analyze the program specification, and generate the graphical program based on the analysis.

In one embodiment, configuration information for the graphical program may be stored, e.g., in one or more of the intermediate structures described above, or may be generated based on the graphical program. In one embodiment, the configuration information may be stored in the graphical program. For example, the graphical program may be tagged with the configuration information. Then, at some later date, the graphical program may be analyzed, e.g., by the assistant or some other tool, to determine the original configuration of the graphical program. The graphical program may comprise one or more features, each of which may comprise a respective one or more graphical program elements. In a preferred embodiment, the configuration information specifies the graphical program at a feature level, i.e., as opposed to the graphical program element level. This configuration information may be useful for subsequent modification of the graphical program.

In various cases, the graphical program code generated by the application assistant may be a fully working program, or may not be a complete program. As an example, the application assistant may generate various graphical program elements or nodes that, in conjunction with additional graphical program elements, may comprise a complete program. However, the creation of the partial graphical program may make it relatively easy for the user to complete the graphical program. In still other cases, it may be desirable to programmatically generate only a graphical code portion, e.g., that aids the user in program development.

In one embodiment, the assistant may use scripting to place specified features or functionality into the graphical program, e.g., into one or more block diagrams. For example, the assistant may determine which features are necessary based on the user input (or program specification), and then may create a batch file or script (or multiple files or scripts) to automate the graphical program generation. Each feature may then be scripted or generated and placed without any further user interaction. In one embodiment, the script or scripts may be generated based on the analysis of the user input. Alternatively, the scripts may have been previously created, where the appropriate scripts are determined based on the analysis of the user input, and retrieved for execution, e.g., via a look-up table. Thus, in one embodiment, the user input may be analyzed, and one or more scripts executed to generate the graphical program.

In one embodiment, generating the graphical program may include analyzing the user input, and invoking one or more low level assistants to generate the graphical program, where each of the low level application assistants executes a respective one or more scripts to generate respective portions of the graphical program. In other words, the application assistant may include, or may operate in conjunction with, a plurality of other assistants, specifically, lower level assistants, where, for example, each assistant is specific or directed to a particular functional aspect of the application. Each low level assistant may assist in the scripting or generation of graphical program code for a respective sub-domain of the application assistant's application domain. Thus, the various assistants (including the application assistant) may comprise a hierarchy of assistants.

Finally, the graphical program may optionally be executed to perform the specified functionality. For example, in one embodiment, user input invoking execution of the graphical program may be received, and the graphical program executed, in response to the invoking. As noted above, in one embodiment, at least a portion of the graphical program may be targeted for execution on a programmable hardware element. More generally, in various embodiments, various portions of the graphical program may be targeted to respective different targets, including, for example, computers, programmable hardware elements, such as FPGAs, PDAs, embedded systems, such as smart sensors, etc., and/or any other type of target capable of executing graphical program code. For example, different scripts may be created specifically for generating graphical program portions or features for execution on particular targets. Alternatively, scripts may be created that are agnostic with regards to target platforms, but which may be configured or specified, to generate graphical program features for specific targets. In other words, the same script may be configured to generate graphical program code aimed at different targets.

In one embodiment, the application assistant may facilitate modification of a previously created block diagram or graphical program. For example, in one embodiment, user input may be received to the GUI specifying import of a previously created graphical program. The previously created graphical program may then be imported in response to the user input specifying the import, configuration information for the imported graphical program analyzed (programmatically), and the GUI may display respective attributes of the imported graphical program based on the analyzing, and, for example, used to populate the graphical interface elements of the GUI with appropriate data. The user may then specify desired (new) functionality for the imported graphical program, as described above, where the application assistant then generates the graphical program (i.e., the modified imported graphical program) based on the specified functionality.

BRIEF DESCRIPTION OF THE DRAWINGS

A better understanding of the present invention can be obtained when the following detailed description of the preferred embodiment is considered in conjunction with the following drawings, in which.

Figure 1A:
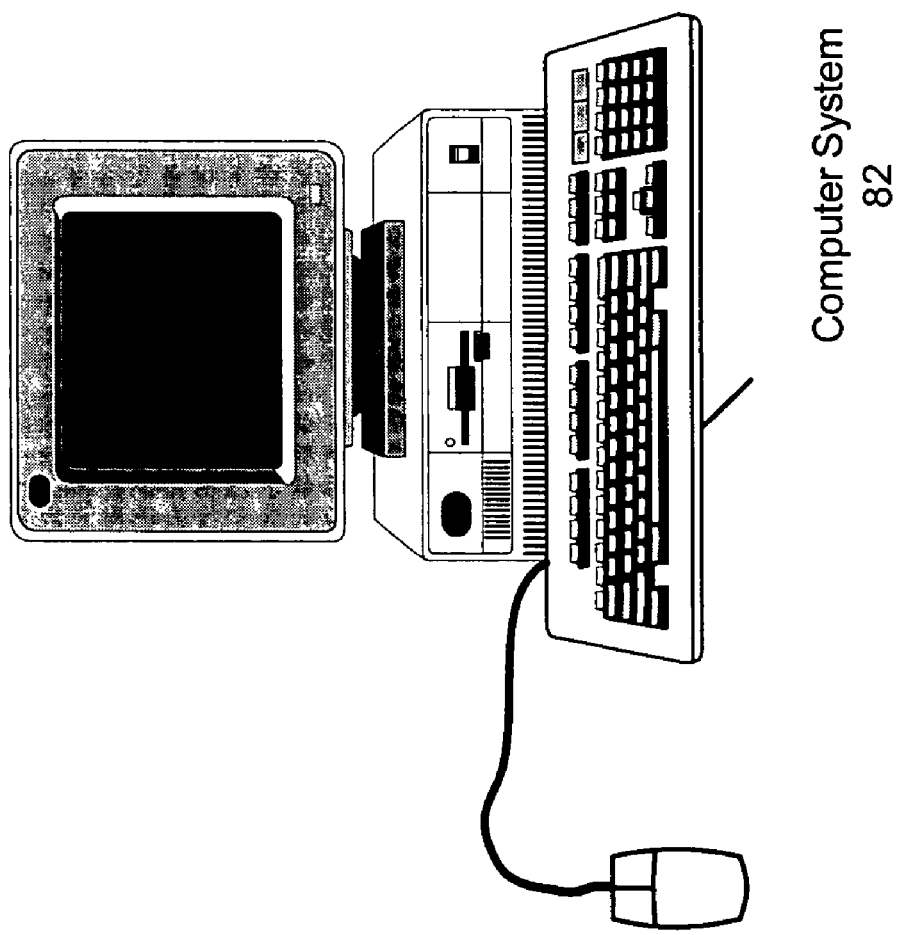
FIG. 1A illustrates a computer system operable to execute a graphical program according to an embodiment of the present invention.

While the invention is susceptible to various modifications and alternative forms specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternative following within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein.

U.S. Pat. No. 5,481,741 titled "Method and Apparatus for Providing Attribute Nodes in a Graphical Data Flow Environment," issued on Jan. 2, 1996.

U.S. Pat. No. 6,064,812 titled "System and Method for Developing Automation Clients Using a Graphical Data Flow Program," issued on May 16, 2000.

U.S. Pat. No. 6,102,965 titled "System and Method for Providing Client/Server Access to Graphical Programs," issued on Aug. 15, 2000.

U.S. patent application Ser. No. 09/136,123 titled "System and Method for Accessing Object Capabilities in a Graphical Program" filed Aug. 18, 1998.

U.S. patent application Ser. No. 09/518,492 titled "System and Method for Programmatically Creating a Graphical Program", filed Mar. 3, 2000.

U.S. patent application Ser. No. 09/595,003 titled "System and Method for Automatically Generating a Graphical Program to Implement a Prototype," filed Jun. 13, 2000.

U.S. patent application Ser. No. 09/745,023 titled "System and Method for Programmatically Generating a Graphical Program in Response to Program Information," filed Dec. 20, 2000.

U.S. patent application Ser. No. 08/912,445 titled "Embedded Graphical Programming System" filed on Aug. 18, 1997, whose inventors were Jeffrey L. Kodosky, Darshan Shah, Samson DeKey, and Steve Rogers.

U.S. patent application Ser. No. 08/912,427 titled "System and Method for Converting Graphical Programs Into Hardware Implementations" filed on Aug. 18, 1997, whose inventors were Jeffrey L. Kodosky, Hugo Andrade, Brian Keith Odom, and Cary Paul Butler.

U.S. patent application Ser. No. 10/177,553 titled "Target Device-Specific Syntax and Semantic Analysis For a Graphical Program" filed on Jun. 21, 2002, whose inventors were Newton G. Petersen and Darshan K. Shah.

TERMS

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1A—Computer System

FIG. 1A illustrates a computer system 82 suitable to implement various embodiments of the present invention. More specifically, computer system 82 may execute software for programmatically or automatically generating at least a portion of a graphical program in response to user input, where for example, the software implements a graphical software tool. One embodiment of a method for receiving user input specifying application domain specific functionality for a graphical program and programmatically generating the graphical program that implements the specified functionality is described below with reference to FIG. 6.

As shown in FIG. 1A, the computer system 82 may include a display device operable to display a graphical user interface (GUI) whereby the user may interact with the software to specify and create graphical program code for a specific application domain. The display device may also be operable to display graphical programs as the graphical programs are created and/or executed. The display device may also be operable to display a graphical user interface or front panel of the graphical program during execution of the graphical program. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more programs, e.g., graphical programs, which are executable to perform the methods described herein. Also, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

The computer system 82 preferably includes or stores a computer program, referred to herein as an application assistant. One embodiment of a method for programmatically generating a graphical program is described below. It should be noted that although the application assistant is described herein as a standalone program, in various embodiments, the application assistant may be implemented in different ways, including, but not limited to, a standalone tool, a plug-in for a graphical development environment, an integrated portion of a development environment, a graphical application programming interface (API), and so forth.

In one embodiment, the application assistant may be implemented as a self-contained program or application that includes all necessary program logic for generating the graphical program. In another embodiment, the application assistant may comprise a client portion and a server portion (or client program and server program), wherein the client portion may request or direct the server portion to perform various aspects of the interface and/or generation functionality. For example, the client portion may utilize an API provided by the server portion in order to generate the graphical program. In other words, the client portion may perform calls to the API provided by the server portion, and the server portion may execute functions or routines bound to these calls to generate the graphical program. In one embodiment, the server portion may be an instance of a graphical programming development environment application. For example, the LabVIEW graphical programming development environment application enables client programs to interface with a LabVIEW server in order to programmatically generate or modify graphical programs.

In some embodiments, rather than generating the graphical program directly, the application assistant may generate one or more scripts or scripting components (referred to collectively herein as a "script"), which may then be executed to generate the graphical program. Thus, in one embodiment, the application assistant may operate as a scripting tool (or equivalent) that may be used to generate or create a script (e.g., a script or scripting component), where the script comprises a graphical program generation (GPG) program.

As used herein, the term "GPG program" is intended to include any of various implementations of a program (or programs) that are executable to programmatically generate a graphical program based on received program information.

For example, the term "GPG program" is intended to include an embodiment in which the GPG program is a self-contained program or application (not implemented as a client/server program) that includes all necessary program logic for programmatically generating a graphical program. The term "GPG program" is also intended to include an embodiment in which a combination of a client portion (or client program) and server portion (or server program) operate together to programmatically generate the graphical program. The term "GPG program" is also intended to include other program implementations.

In an embodiment in which a client program interfaces with a server program to generate the graphical program (or scripts), the server program may execute on the same computer system as the client program or may execute on a different computer system, e.g., a different computer system connected via a network. For example, in FIG. 1B, the client program may execute on the computer system 82, and the server program may execute on the computer system 90. In this case, the graphical program, and/or script, may be created on the computer system 82, or 90, or on a different computer system. Thus, the application assistant may be distributed over a plurality of computers, or may be executed on a single computer.

It is noted that the application assistant may be implemented using any of various programming technologies or methodologies. Where the application assistant is implemented as client and server programs, each of these programs may utilize procedure-based techniques, component-based techniques, and/or object-oriented techniques, among others. The programs may be written using any combination of text-based or graphical programming languages. Also, the programs may be written using distributed modules or components so that each program may reside on any combination of computer system 82, computer system 86, and other computer systems connected to the network 84. Also, in various embodiments, the client program may interface with the server program through a proxy software component or program.

Figure 1B:
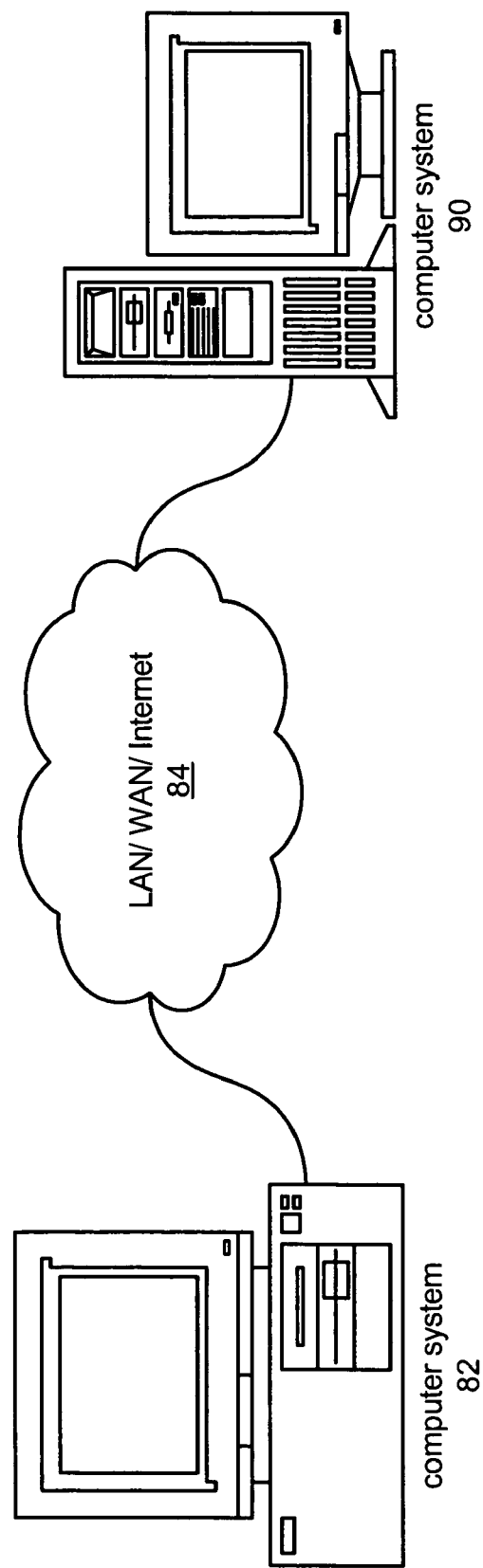
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute the application assistant in a distributed fashion. For example, computer 82 may execute a first portion of the application assistant and computer system 90 may execute a second portion of the application assistant. As another example, computer 82 may display the graphical user interface of the application assistant and computer system 90 may execute the core functionality of the application assistant.

In embodiments where the application assistant generates a script, the script may be executed to generate graphical program code in a graphical program, where, for example, the graphical user interface of the graphical program may be displayed on a display device of the computer system 82, and the block diagram may execute on a device connected to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the generated graphical program may be used include hardware-in-the-loop testing and rapid control prototyping, among others.

However, it is noted that the present invention can be used for a plethora of applications and is not limited to the above applications, but rather it is contemplated that application assistants may be created and used for any application domains desired. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc. In other embodiments, the application assistant may be used to generate graphical program code for general purpose software applications such as word processing, spreadsheets, network control, network monitoring, financial applications, games, etc.

Figure 2A:
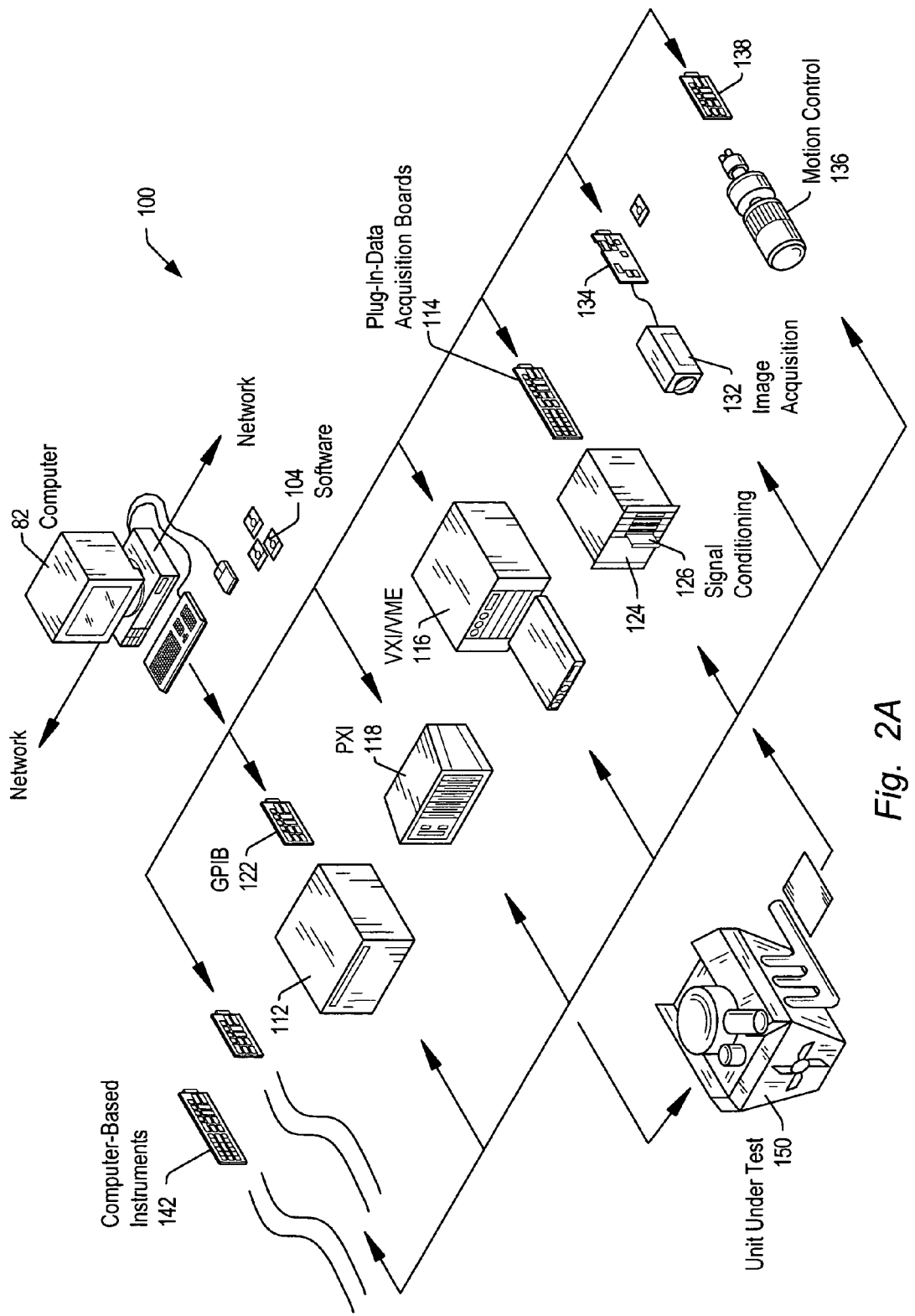
FIG. 2A illustrates an instrumentation control system including various I/O interface options, according to one embodiment of the invention.
Figure 2B:
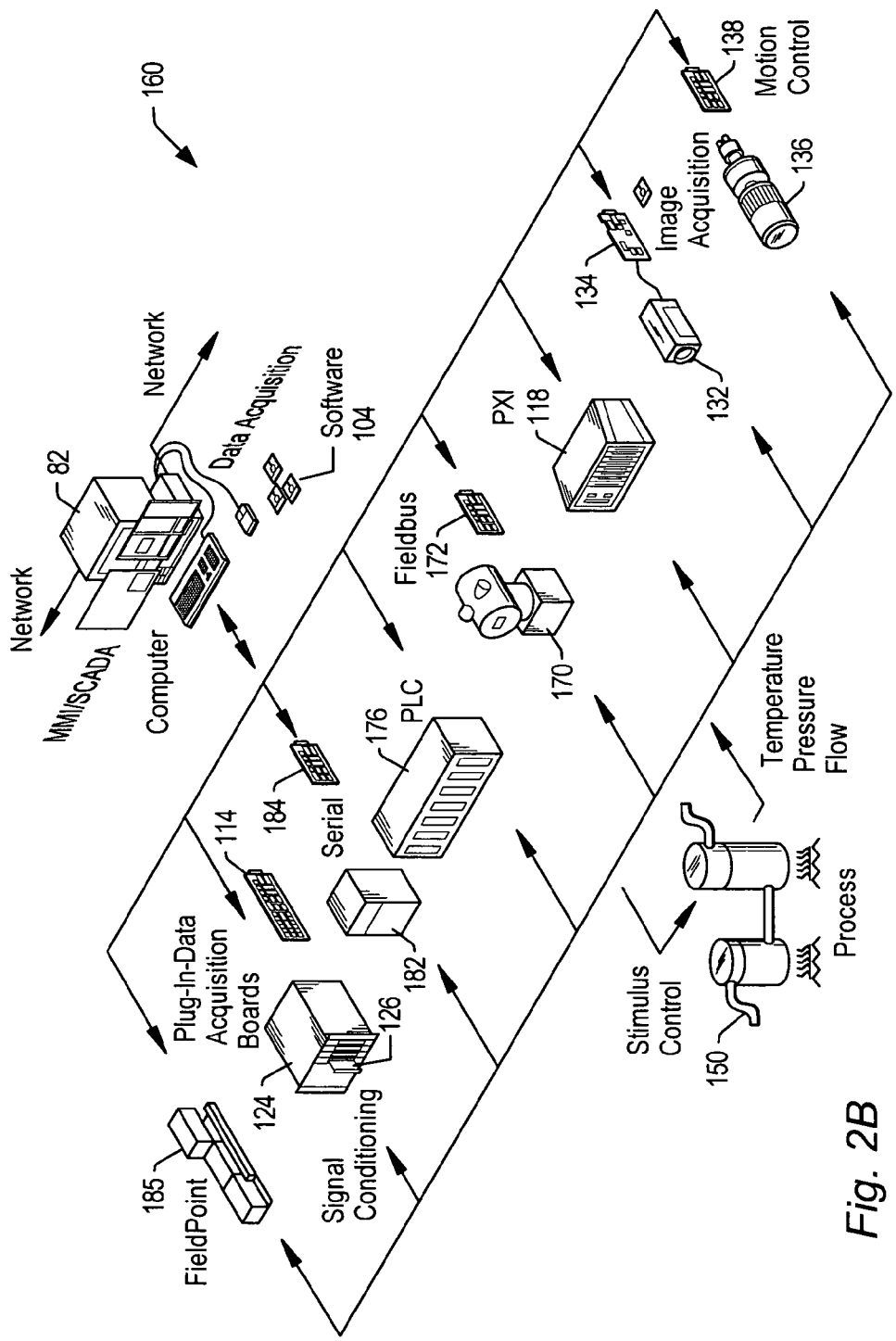
FIG. 2B illustrates an industrial automation system including various I/O interface options, according to one embodiment of the invention.

FIGS. 2A and 2B—Instrumentation and Industrial Automation Systems

FIGS. 2A and 2B illustrate exemplary systems which may store or use an application assistant (optionally with a server program) that is operable to create a graphical program or a portion of a graphical program (possibly via scripting). Also, these systems may execute a programmatically generated graphical program. For example, the graphical program may perform an instrumentation function, such as a test and measurement function or an industrial automation function. It is noted that the application assistant, the server program, and/or a generated graphical program may be stored in or used by any of various other types of systems as desired and may implement any function or application as desired. Thus, FIGS. 2A and 2B are exemplary only.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150, e.g., utilizing software 104.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others, e.g., utilizing software 104.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

In one embodiment, the application assistant and/or the resulting graphical program that is programmatically generated may be designed for data acquisition/generation, analysis, and/or display, and for controlling or modeling instrumentation or industrial automation hardware. For example, in one embodiment, the National Instruments LabVIEW graphical programming development environment application, which provides specialized support for developers of instrumentation applications, may act as the server program. In this embodiment, the client program may be a software program that receives and processes program information and invokes functionality of the LabVIEW graphical programming development environment. The client program may also be a program involved with instrumentation or data acquisition.

However, as noted above, the present invention can be used for a plethora of applications and is not limited to instrumentation or industrial automation applications. In other words, FIGS. 2A and 2B are exemplary only, and graphical programs for any of various types of purposes may be generated by an application assistant designed for any of the various types of purposes, wherein the programs are stored in and execute on any of various types of systems. A specific example of an application assistant directed at control loops, and graphical programs generated thereby are discussed below.

Figure 3A:
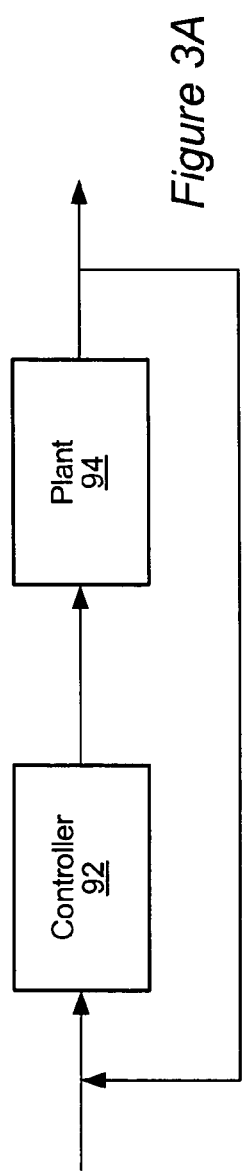
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
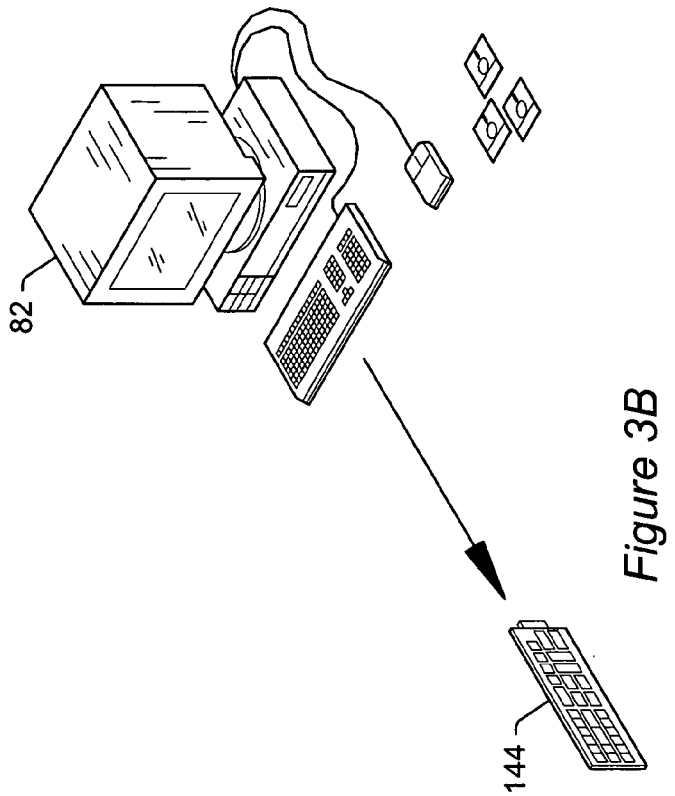
FIG. 3B illustrates an exemplary system which may perform control and/or simulation functions utilizing graphical programs.

FIG. 3B illustrates an exemplary system which may perform control and/or simulation functions. As shown, the controller, 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
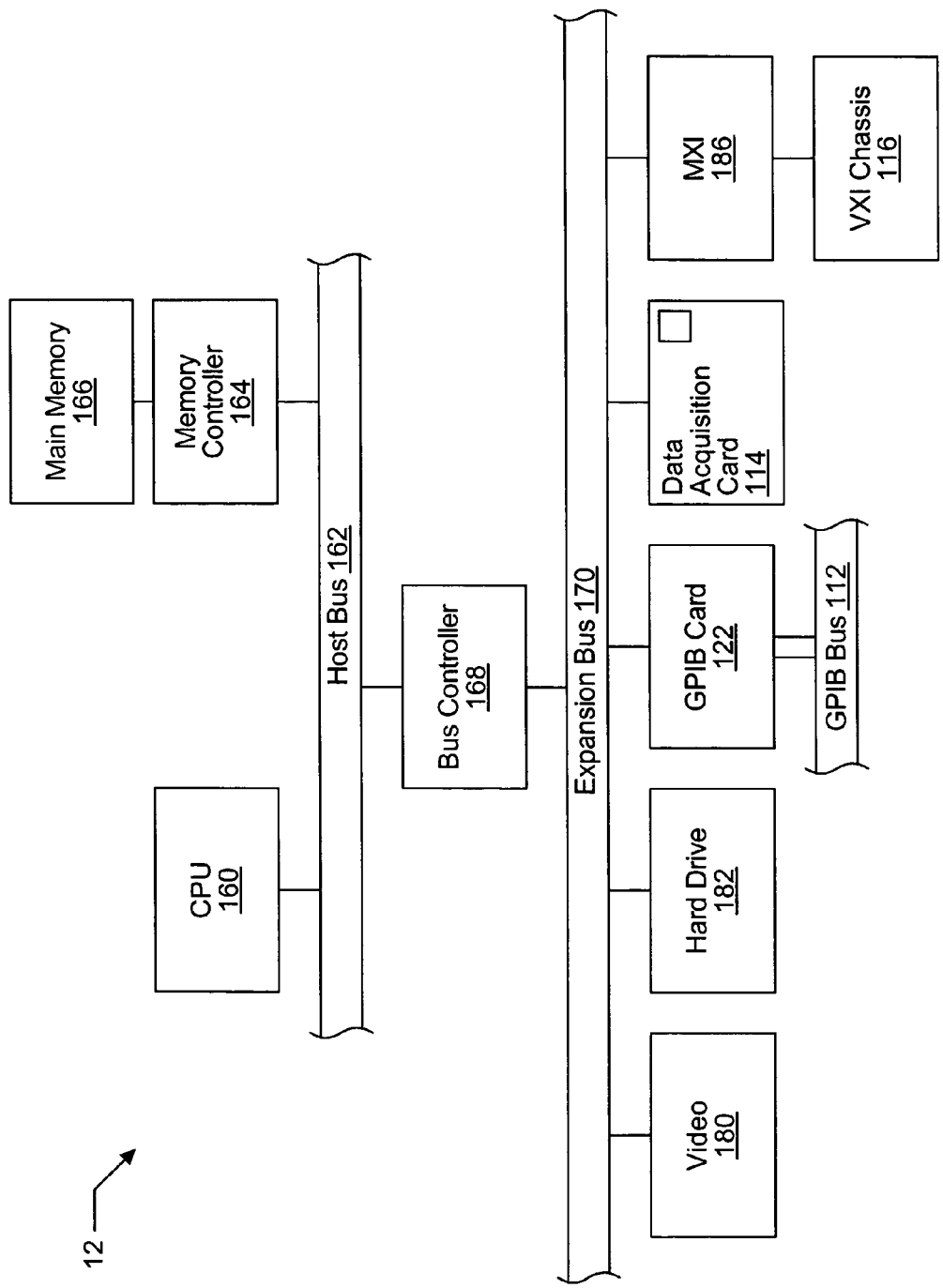
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an ×86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the application assistant operable to programmatically or automatically generate at least a portion of a graphical program, e.g., graphical code, in accordance with a user-specified configuration. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 as well as a GPIP Card 122 with a GPIB bus 112, a Data Acquisition (DAQ) card 114, and a VXI chassis 116 with a Multisystem eXtension Interface (MXI) 186, coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Application Assistant

In one embodiment, a tool, e.g., an application assistant, may be used to specify or otherwise define the organization of features in an application, i.e., in a graphical program. In a preferred embodiment, an application assistant may be designed to build block diagrams for a specific class of applications, such as control loops, timer/counters, I/O, signal generation, etc. The creator of the assistant preferably has domain knowledge about the individual features and how they relate to one another for this class of applications. For example, a control loop may have independent triggers for input and output resources. Therefore the assistant preferably knows which features are defined as input resources and which are defined as output resources so that they may be placed correctly in the block diagram. In one embodiment, a simple assistant may provide the ability to configure timing, triggering, and I/O features. In more advanced embodiments, extensions to this basic functionality may include advanced I/O, types, embedded processing, and inclusion of user created features, resource allocation, processing options, inclusion of external files, and target devices for the graphical program, among others. Further details of an example application assistant and its use are provided below.

Figure 5:
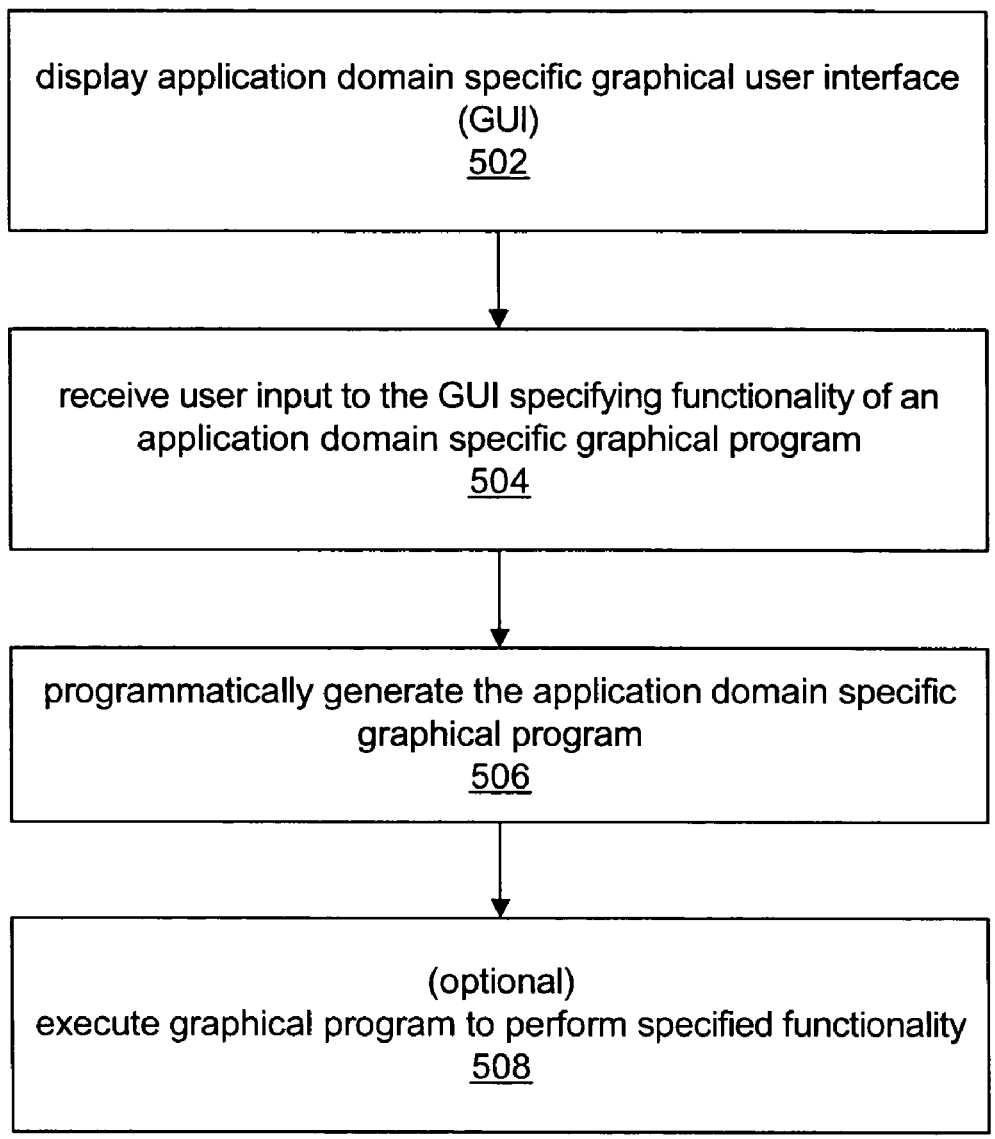
FIG. 5 is a flowchart diagram of a method for programmatically generating a graphical program in a specific application domain, according to one embodiment.

FIG. 5—Programmatic Generation of an Application Domain Specific Graphical Program FIG. 5 is a high-level flowchart of a method for programmatically generating a graphical program, where the graphical program functionality is specific to an application domain. As noted above, the method described below is preferably performed by an application assistant (or equivalent) that includes a GUI for displaying information to a user and for receiving input from the user, e.g., via a plurality of fields, sections, or panels displayed on a computer monitor. Note that in various embodiments, some of the steps shown may be performed concurrently, in a different order than shown, or omitted. Additional steps may also be performed as desired.

The method of FIG. 5 is described below with respect to a control loop application, where, for example, a first portion of the application is targeted for execution on a programmable hardware element, such as an FPGA, and a second portion of the application is targeted for execution on a host computer system, where the first and second portions execute in a coordinated manner to perform the application domain specific functionality, e.g., the control loop. However, it should be noted that this is but one example of an application assistant, and that other types of application assistants (or equivalent) are also contemplated for any application domain desired. Application domains contemplated include, but are not limited to, control loops, timer/counters, data acquisition, machine vision, and so forth. Note that the specificity of the various domains contemplated may vary widely, and that domains may also be hierarchical. For example, consider control. At a high level, control usually refers to maintaining a system at a setpoint through the use of command outputs and feedback inputs. An application assistant may be created that deals with this domain at a fairly simple and general level. For example, in one embodiment, the assistant may provide or facilitate a single timed loop, and may allow the user to specify the inputs to be sampled and the outputs to be driven, where, for example, all of the processing occurs in the host. This example assistant may be used for many types of control applications.

However, there are many sub-domains that may benefit from more specific application assistants. These more specific application assistants (e.g., control assistants) may offer options that are tuned or correspond to the more narrow domains. For example, consider a servo motor positioning controller. This type of controller operates to rotate a motor in a controlled fashion from one position to another. The system typically includes forward and reverse limit switches used to indicate the end of travel, and implemented as digital inputs. Instead of just presenting generic digital I/O, the assistant may ask which lines are specifically to be used as limit switches. The feedback mechanism for the majority of servo motor applications is some form of quadrature encoder. Although the assistant may present other options for feedback, in some embodiments, it may offer a richer set of quadrature interfaces than the generic assistant might, and may offer the quadrature interface as the default selection.

Thus, in various embodiments, application assistants may be provided for any domain or sub-domain desired, including, for example, control, e.g., control loops, motion control, etc., timer/counters; measurement, e.g., data acquisition, waveform generation, etc., data analysis, e.g., pattern matching, image and/or signal processing, etc., machine vision, hardware in the loop simulation, simulation, and embedded systems, among others. Note that these application domains and sub-domains are meant to be exemplary only, and are not intended to limit the fields, domains, or sub-domains, to which application assistants may be directed.

In 502, an application domain specific graphical user interface (GUI) may be displayed, e.g., on a display device, such as a computer monitor. In other words, a graphical user interface (GUI) may be displayed for specifying functionality of a graphical program in an application domain, wherein the GUI corresponds specifically to the application domain. In a preferred embodiment, the GUI includes a plurality of graphical interface elements, e.g., controls and/or indicators, operable to specify and/or indicate respective attributes of the graphical program.

Figure 6:
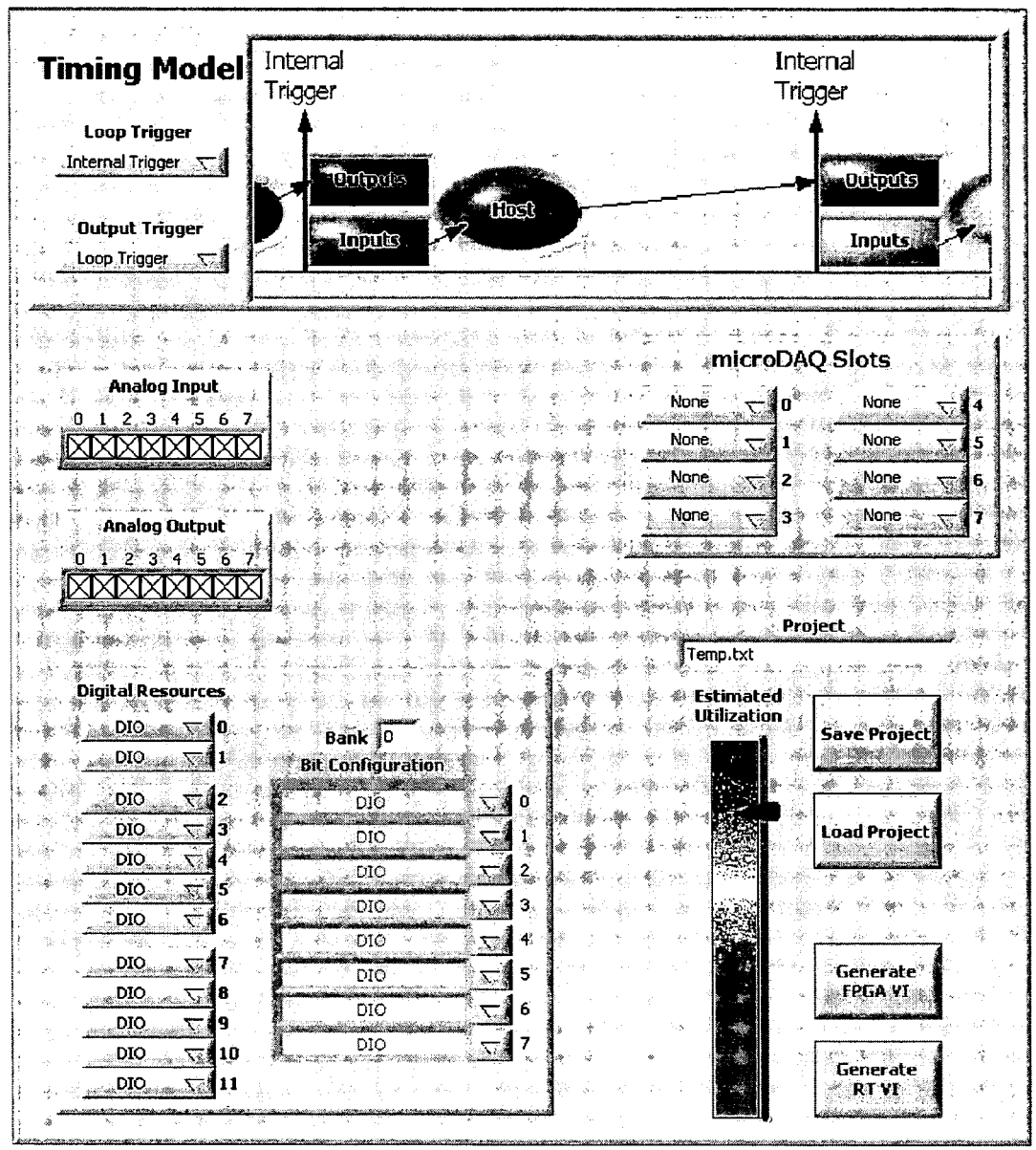
FIG. 6 illustrates an application assistant for creating a graphical program for use in a specific application domain, according to one embodiment.

FIG. 6 illustrates one embodiment of such a GUI, where the GUI shown is specific to control loops. In other words, FIG. 6 illustrates one embodiment of a control assistant for configuring a control application targeted for at least partial execution on an FPGA, although it should be noted that the embodiment shown is intended to be exemplary only, and is not intended to limit the control assistant to any particular form, appearance, or functionality. Similarly, as noted above, the control assistant is provided as an example application assistant, and is not intended to limit the domains of application to any domain or set of domains.

As is well known to those skilled in the art, control applications typically wait for data to be ready, read the inputs, perform some processing, write the outputs, and start waiting again. The timing (including triggering and synchronization) and I/O are typically performed in hardware, while the control algorithm runs in software on a processor. In one embodiment, the application assistant may display, and may also allow the user to specify, a timing model for the application.

As FIG. 6 shows, at the top of the GUI is shown a timing model indicating timing and triggering for the application, as well as various fields for specifying other aspects of the desired functionality, described in more detail below. In this example, controls are provided in the timing model section for specifying a loop trigger and an output trigger, where each trigger may be specified as internal, external, or software-based. In this example, the output trigger may also be specified to be the loop trigger. Note that in other embodiments, e.g., in other application assistants, other trigger options may be presented, e.g., analog or digital triggering, and so forth.

Figure 7:
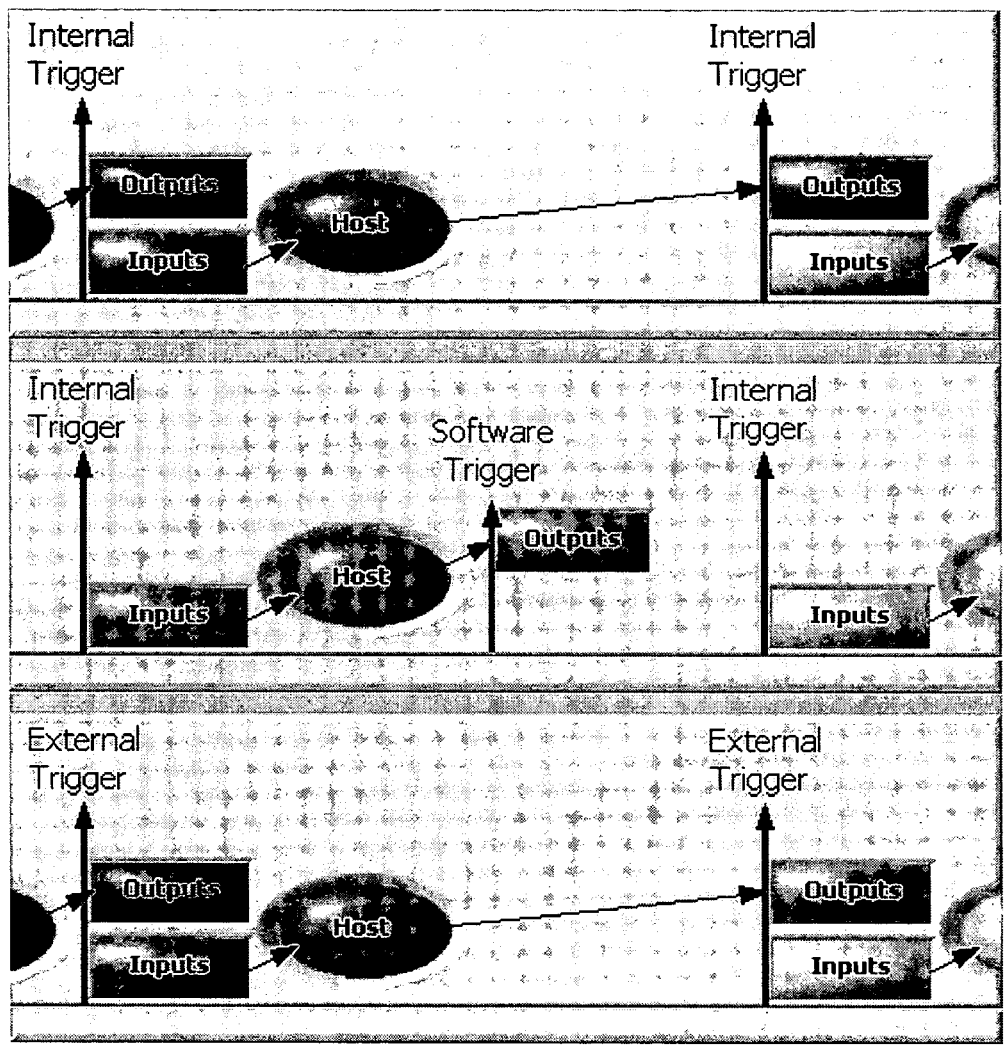
FIG. 7 illustrates exemplary timing models for a control loop, according to one embodiment.

As FIG. 6 indicates, the timing model shown specifies that an internal trigger initiates output from the previous iteration as well as input to the host for the current iteration. There are numerous common timing configurations suitable for use with a control loop, a few of which are illustrated in FIG. 7. As FIG. 7 illustrates, each of the timing models is represented by a timing diagram that specifies timing and triggering for each iteration of the control loop. Note that in these diagrams, time increases from left to right, and two iterations of the control loop are shown.

For example, in the first (top) timing model diagram, an internal trigger is used to initiate output from the previous iteration as well as input to the host for the current iteration, as indicated. In other words, the two internal triggers shown are actually the same trigger on successive iterations of the loop. Note that this timing model is the same as that of FIG. 6. In the second (middle) timing model diagram, an internal trigger initiates input to the host, while a software trigger (executing on the host) triggers output. In the third (bottom) timing model diagram, an external trigger initiates output from the previous iteration as well as input to the host for the current iteration.

As FIG. 6 also shows, in this embodiment, controls are provided for specifying, loading, and saving, the project within which the application is being developed. Controls are also provided for specifying analog and digital I/O resources, e.g., features, lines or channels (analog input, analog output, and digital resources sections), etc. For example, in this embodiment, up to 8 analog input features and up to 8 analog output features may be specified for inclusion in the application. In the digital resources section, 12 banks of DIO lines (0-11) are provided, where each bank includes 8 lines, as well as a section for specifying particular lines for a given bank. As is well known in the art, DIO lines may be used as simple lines, or may be used to implement more complex DIO resources, such as counters, filters, etc., such as, for example, event counters, quadrature encoders, and so forth.

In this particular example, a section, labeled "microDAQ Slots", is also provided for specifying use of external modules or cartridges, e.g., external I/O resources. For example, one or more of the DIO lines may be used to control selected modules, where, for example, the DIO lines may control a passive backplane which couples to the modules. Thus, in one embodiment, external I/O resources may also be incorporated into the control application functionality.

In this example, one portion of the control application being configured is intended for execution on an FPGA, as mentioned above, while another portion of the application is intended for execution under a real time operating system, such as, for example LabVIEW RT. Thus, controls, labeled "Generate FPGA VI" and "Generate RT VI", may be provided to generate each of these portions separately. Note that the control application being configured in this example corresponds to block diagrams illustrated in FIGS. 8A and 8B, and described in more detail below.

In 504, user input may be received to the GUI, where the user input specifies the functionality of the graphical program. In other words, the user may provide input, e.g., via a pointing device, keyboard, voice, and/or any other type of user interface means, to the GUI, e.g., by manipulating controls, entering alphanumeric data, etc., to specify desired functionality or otherwise configure the application as desired. For example, the user input to the GUI may specify such aspects of the graphical program as timing, triggering, analog input/output (I/O), digital I/O, resource allocation, mathematical algorithms and/or other processing, one or more target devices, and/or inclusion of one or more external files in the graphical program, e.g., user created subVIs or third party programs, among others.

For example, an external files option may enable the user to include functionality in the scripted diagram or graphical program that is not included in the assistant itself. For example, it may not be feasible for the assistant to include every type of counter that could be imagined in a selection list. Thus, for example, the user may create a custom counter and access it through the assistant as an external file, e.g., in the form of a VI, a VHDL file, or any other means of specifying functionality.

There may also be cases where the custom function is not created by the user, but rather by a third party, in which this case the user may still include the third party function or file through the external files approach. Third party functions or files are theoretically no different than what the user could create himself, but may be more feasible for a customer to purchase rather than create in some circumstances.

Examples of processing options include, but are not limited to, inline processes, such as, for example, inline processing of filtering, peak detection, etc., in an analog input stream, or higher level processing such as the inclusion of a PID loop that uses multiple resources. In other words, different types of processing may be selected by the user and implemented in the FPGA.

For example, in one example of a "no processing" case, the user may configure a control application to simply sample an analog input and return the data to the host. The control algorithm is preferably performed on the host, and the output data written back to the FPGA, which may then pass the data to an analog output. In this particular example, the user may decide that the returned data are too noisy, and so may add inline processing in the FPGA to apply to the analog input data, e.g., a low pass filter, so that the FPGA VI (or other type of program deployed to the FPGA) returns filtered data to the host instead of the raw data. The user may then decide that the control loop is too slow with the main control algorithm executing on the host, and so may decide to move the algorithm directly into the FPGA. Once deployed to the FPGA, the algorithm may execute to receive the filtered analog input data, perform its processing, and write to the analog output. Note that in various embodiments, the processing functions may operate on single or multiple resources, the resources may be of different types, and the resources themselves may actually be the results of processing performed on lower level resources.

In a preferred embodiment, in specifying timing for the graphical program, the user input may specify a timing model for the graphical program, where the GUI is operable to display a graphical representation of the timing model in response to the user input, as described above and illustrated in FIGS. 6 and 7.

In one embodiment, the GUI may be dynamic with respect to the user input (or with respect to input from other sources). For example, in an embodiment where the user input to the GUI specifies one or more target devices for the graphical program, the plurality of graphical interface elements (comprised in and displayed by the GUI) may be determined based on the specified one or more target devices for the graphical program, where the plurality of graphical interface elements correspond to respective attributes of the graphical program appropriate to the one or more target devices. In other words, if the specified target device (or devices) has no digital resources, i.e., no digital lines, then the GUI may not include graphical interface elements for specifying digital resources.

In another embodiment, once the user has specified the functionality of the graphical program, the application assistant may determine one or more suitable target devices for the graphical program based on the specified functionality, and the GUI may indicate the one or more suitable target devices, e.g., via a list box or other means. User input may then be received selecting at least a subset of the one or more suitable target devices for deployment and execution of the graphical program. In other words, the assistant may be operable to restrict the possible target devices presented to the user to those capable of supporting the specified functionality. Thus, if digital resources are specified by the user, the GUI preferably presents target devices for selection that include such digital resources.

As also described above, in one embodiment, at least a portion of the graphical program is targeted for execution on a programmable hardware element. In one embodiment, the GUI may able operable to display an estimated utilization of the programmable hardware element by the graphical program. For example, in one embodiment, as the user specifies the various options, e.g., the analog/digital I/O resources, etc., the assistant may estimate the utilization of the FPGA for this specific application and may display this information, e.g., via an indicator, such as a bar or "thermometer" indicator, shown in FIG. 6, and labeled "Estimated Utilization". This immediate feedback may help the user make better decisions about resource allocations and selections without waiting for a long compile step.

Then, in 506, the graphical program may be programmatically or automatically generated in response to the user input. The graphical program comprises a plurality of interconnected graphical program nodes that visually represents the functionality of the graphical program, and is executable to perform the specified functionality.

Following the control example of FIG. 6, in one embodiment, the assistant may generate both the FPGA diagram intended for the hardware and the RT diagram targeting the processor. As noted above, in the bottom right portion of the GUI are controls for specifying the target platform for the generated application or VI, i.e., an FPGA or a real time OS (e.g., LabVIEW RT), running on the host computer. Thus, in a preferred embodiment, the GUI may be further operable to receive user input specifying deployment of the graphical program to one or more target devices, and the application assistant may deploy the graphical program to the one or more target devices in response to receiving the user input specifying the deployment of the graphical program. This feature may substantially speed development for the user, who can presumably then focus attention and effort on the algorithms of the application, rather than low-level logistics such as data transfer and synchronization. In one embodiment, the GUI may be further operable to display the generated graphical program, an example of which is described below with reference to FIGS. 8A and 8B. In a further embodiment, the GUI may be further operable to receive user input invoking execution of the graphical program, and the graphical program executed on the one or more target devices in response to the invoking.

As noted above, in this example control application, the generated graphical program is a distributed graphical program comprising a first portion and a second portion, where the first portion is targeted for execution on a first device, and wherein the second portion is targeted for execution on a second device, and where the first portion and the second portion are respectively executable on the first device and the second device to perform the specified functionality in a cooperative manner.

Figure 8A:
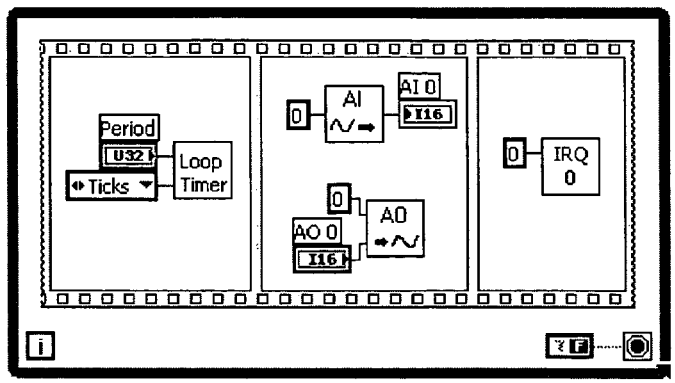
FIGS. 8A and 8B illustrate programmatically generated block diagrams, according to one embodiment.
Figure 8B:
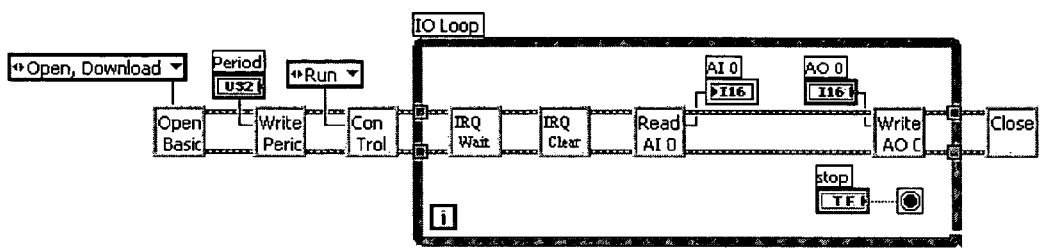

As described above, a graphical program preferably includes a block diagram comprising a plurality of interconnected graphical program elements, e.g., nodes or icons. FIGS. 8A and 8B illustrate example graphical programs designed to operate in conjunction as a control application, which typically waits for data to be ready, reads the inputs, performs some processing, writes the outputs, and starts waiting again. The timing and I/O are typically performed in hardware, executing on a programmable hardware element (e.g., an FPGA), while the control algorithm executes in software on a processor (e.g., computer system 82). Thus, FIG. 8A illustrates the first portion of the graphical program, targeted for deployment and execution on a programmable hardware element, e.g., an FPGA, and FIG. 8B illustrates the second portion of the graphical program, targeted for deployment and execution on a host computer system.

As mentioned above, the FPGA block diagram (FIG. 8A) defines the behavior of the hardware. According to the specified timing model, the block diagram should include a timer to control how often the I/O is sampled, the actual I/O functionality, and a notification mechanism (an interrupt in this case) to tell the software that data are ready. Note that in the embodiment of FIG. 6, the GUI is operable to display an estimated utilization of the programmable hardware element by the first portion of the graphical program, e.g., by the block diagram of FIG. 8A.

In this example, the FPGA is assumed to be connected to fixed I/O resources, such as analog inputs, analog outputs, and digital inputs and outputs. A "personality" may be loaded into the FPGA to define the overall behavior of the board. This personality may be created using a development environment, such as LabVIEW FPGA, which creates a hardware implementation of a graphical program, e.g., of a LabVIEW diagram. Thus, the LabVIEW FPGA diagram preferably defines the behavior of the hardware. As shown, the example diagram of FIG. 8A includes a timer to control how often the I/O is sampled, the actual I/O (analog input (AI) and analog output (AO)), and a notification mechanism (an interrupt in this case) to tell the software that data are ready. As FIG. 8A also shows, a timing or sequence structure encloses these elements and ensures that their respective functions are performed in an appropriate sequence. Note that the timing structure includes three frames within which features, i.e., graphical program elements implementing the features, may be executed in an ordered sequence.

As noted above, FIG. 8B is an example block diagram, in this case, a LabVIEW RT diagram, targeted for execution by a processor. This diagram defines the behavior of the software, downloading the FPGA personality (the diagram of FIG. 8A) to the FPGA board, setting the timer to the desired loop rate, and starting the LabVIEW FPGA diagram running. As FIG. 8B also shows, the diagram then waits in a loop for data to be ready, reads the inputs, writes the outputs, and then starts waiting again. Graphical program elements implementing any algorithm to be performed on the data may be placed between the AI and AO elements (VIs) in the diagram.

Figure 8C:
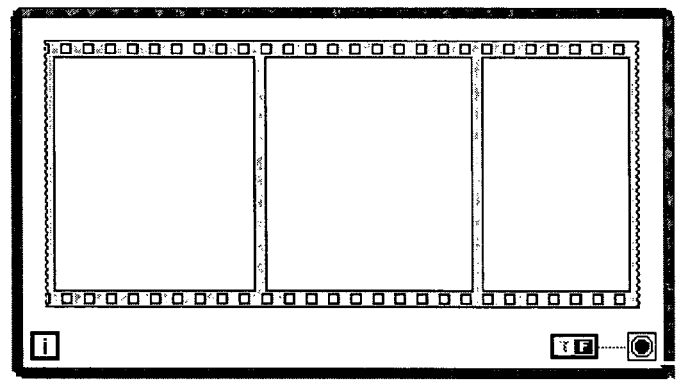
FIG. 8C illustrates exemplary block diagram features, according to one embodiment.
Figure 8C:
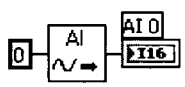
Figure 8C:
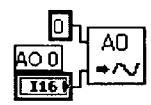
Figure 8C:
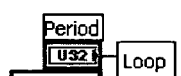
Figure 8C:

Each of the block diagrams shown includes various graphical program features providing respective functionalities for the block diagrams. Each of these features, also referred to as feature templates, typically includes one or more graphical program elements. FIG. 8C illustrates the graphical program features used in the block diagram of FIG. 8A, specifically, a timing structure, analog input, analog output, a timer, and an interrupt. Note that a feature may include a plurality of graphical program elements. For example, the analog input feature shown includes an analog input node (labeled "AI", with a waveform and arrow icon), an input icon, e.g., a constant indicating a device or channel/line, and an output icon or terminal (I16—a sixteen bit integer), e.g., for providing output to an indicator. Thus, the generation of the graphical program may be performed in terms of program features, rather than at the level of individual graphical program elements. Note that the features shown are meant to be exemplary only, and are not intended to limit features to any particular set of forms or functionalities, but rather, contemplated features may include any definable functionality that can be represented or implemented in a graphical program. Thus, a graphical program may include a plurality of defined features. Conversely, a user may construct a graphical program from a set of graphical program features, described below.

In various embodiments, the graphical program code may be generated using any of various methods or techniques. For example, in one embodiment, the application assistant may analyze the inputs provided by the user in 504 and determine appropriate graphical program elements corresponding to the specified functionality, and may configure the determined graphical program elements accordingly, including setting values of one or more parameters and interconnecting ("wiring") the graphical program elements to implement the correct input/output relationships between them.

In other embodiments, in generating the graphical program, the application assistant may generate one or more intermediate structures, e.g., data structures or files. For example, the application assistant may analyze the user input (of 504), generate one or more data structures based on the analysis, and generate the graphical program based on the one or more data structures. As another example, the application assistant may generate a program specification based on the user input, then parse and analyze the program specification, and generate the graphical program based on the analysis.

More generally, generating the graphical program may comprise generating one or more files defining or describing the graphical program code. For example, the program files may specify information such as a set of nodes that the graphical program uses, interconnections among these nodes, programmatic structures such as loops, etc. In other cases, the program files may store various data structures, e.g., in binary form, which the graphical programming environment uses to directly represent the graphical program. Thus, in programmatically generating the graphical program code, the application assistant may programmatically generate one or more files representing the graphical program, where, for example, these files may be structured or formatted appropriately for a particular graphical programming environment.

In one embodiment, configuration information for the graphical program may be stored. The configuration information may be comprised in one or more of the intermediate structures described above, or may be generated based on the graphical program. In one embodiment, the configuration information may be stored in a configuration file; however, this may require that the configuration file be kept with, or otherwise maintained with, the graphical program. Thus, in a preferred embodiment, the configuration information may be stored in the graphical program. For example, the graphical program may be tagged with the configuration information. Then, at some later date, the graphical program tags may be analyzed, e.g., by the assistant or some other tool, to determine the original configuration of the graphical program.

As noted above, in one embodiment, the graphical program may comprise one or more features, each of which may comprise a respective one or more graphical program elements. In a preferred embodiment, the configuration information specifies the graphical program at a feature level, i.e., as opposed to the graphical program element level. This configuration information may be useful for subsequent modification of the graphical program, described below.

In various cases, the graphical program code generated by the application assistant may be a fully working program. Thus, the user may load the generated graphical program into the graphical programming environment, execute the program, etc. In other cases, the generated graphical program code may not be a complete program. As an example, the application assistant may generate various graphical program elements or nodes that, in conjunction with additional graphical program elements, may comprise a complete program. However, the creation of the partial graphical program may make it relatively easy for the user to complete the graphical program. In still other cases, it may be desirable to programmatically generate only a graphical code portion, e.g., that aids the user in program development.

In one embodiment, the assistant may use scripting to place specified features or functionality into the graphical program, e.g., into one or more block diagrams. For example, the assistant may determine which features are necessary based on the user input (or program specification), and then may create a batch file or script (or multiple files or scripts) to automate the graphical program generation. Each feature may then be scripted or generated and placed without any further user interaction. In one embodiment, the script or scripts may be generated based on the analysis of the user input. Alternatively, the scripts may have been previously created, where the appropriate scripts are determined based on the analysis of the user input, and retrieved for execution, e.g., via a look-up table. Thus, in one embodiment, the user input may be analyzed, and one or more scripts executed to generate the graphical program.

Figure 9A:
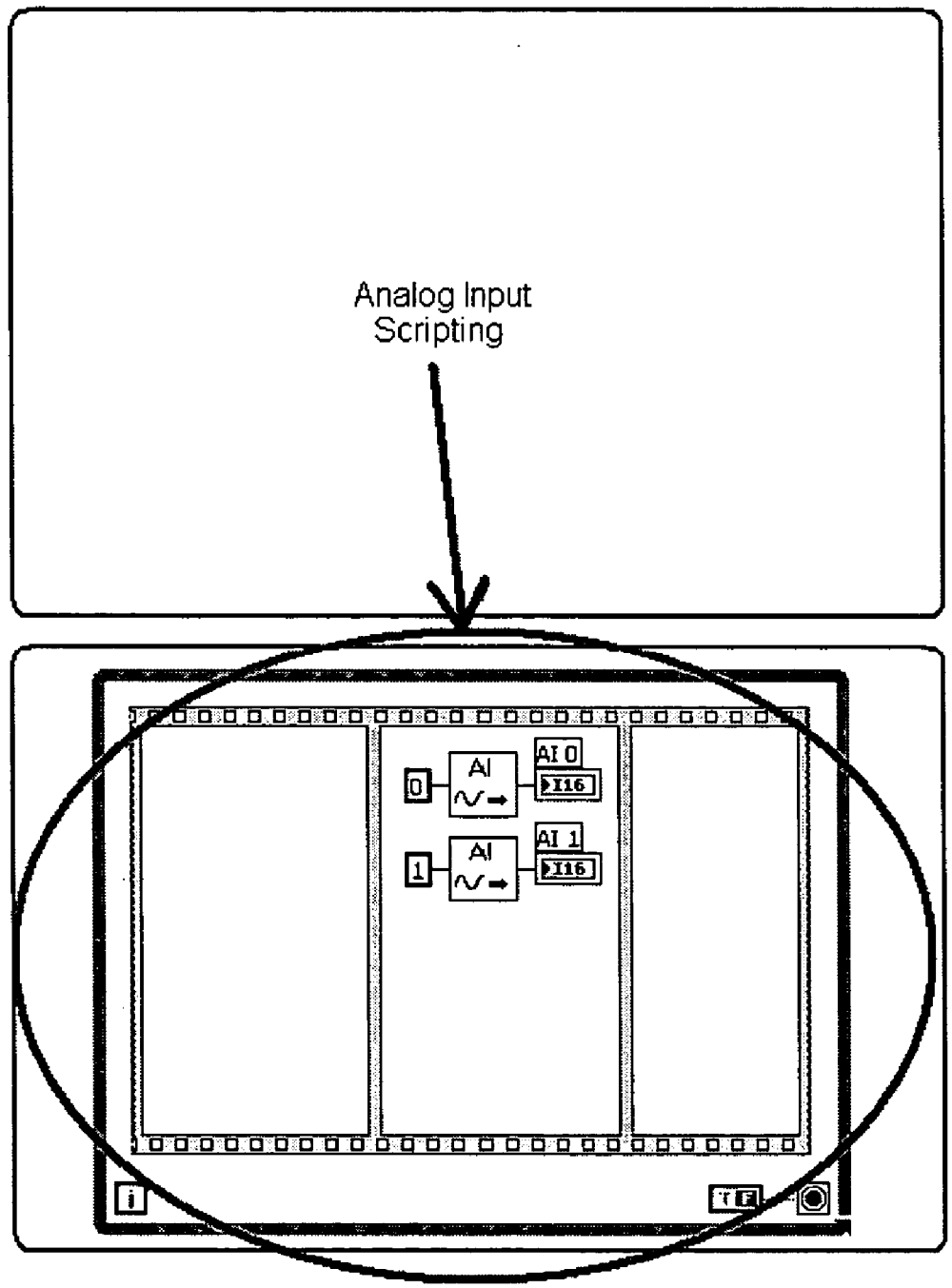
FIGS. 9A and 9B illustrate generation of analog input and analog output features in a block diagram, according to one embodiment.
Figure 9B:
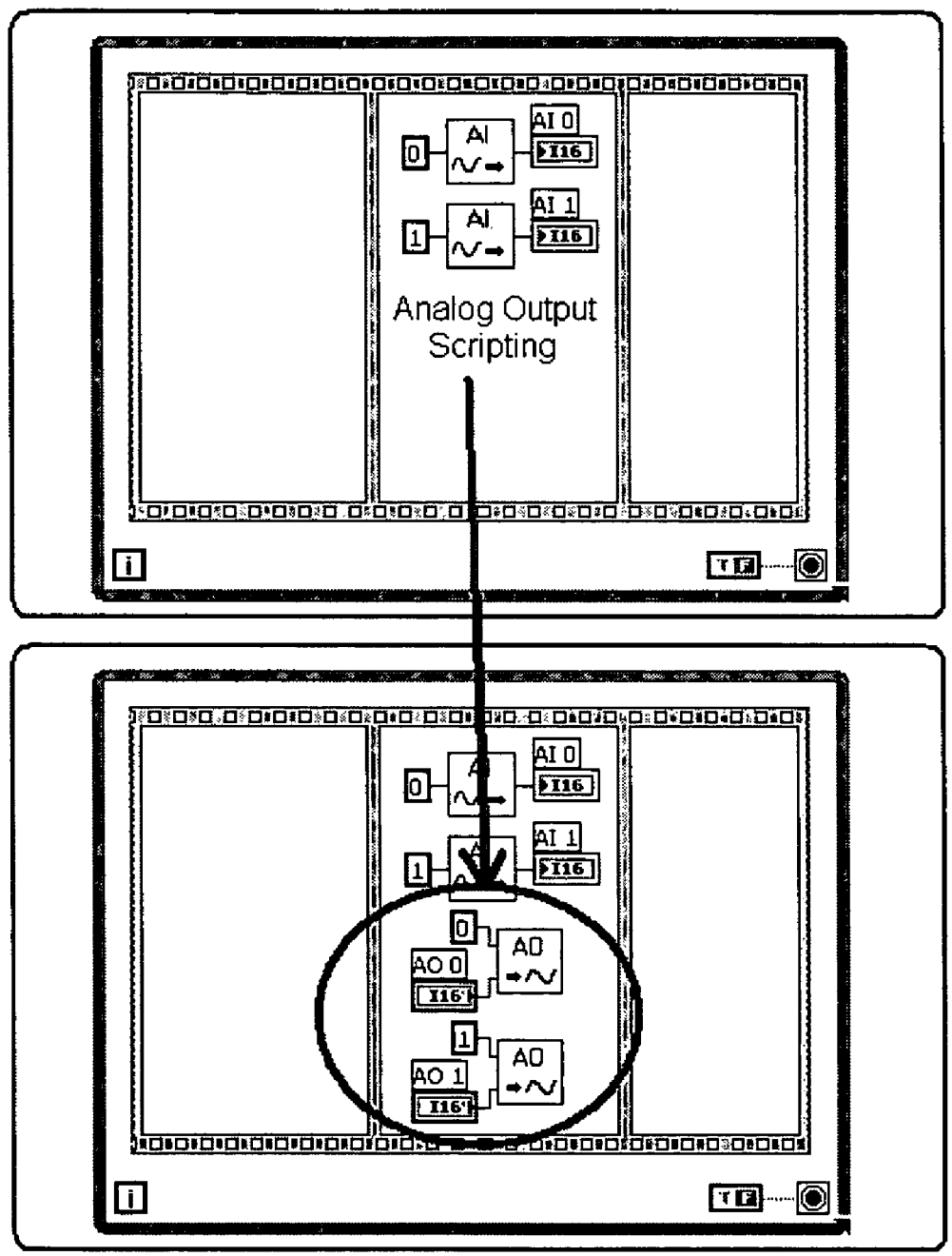

FIGS. 9A and 9B illustrate generation or scripting of program features, specifically, analog input and analog output features in a timing feature, into a block diagram of a graphical program, according to one embodiment. As FIG. 9A shows, starting with a blank block diagram (top diagram), an AI script or script portion may be created or configured to generate two instances of an AI feature in a timing feature, and may execute to generate the two AI feature instances in the timing structure as configured by the user, here shown in the middle frame of the timing structure (bottom diagram).

FIG. 9B illustrates placement of AO features in the block diagram of FIG. 9A. As FIG. 9B shows, in this example, an AO script has been created or configured to generate two instances of an AO feature in a timing feature. However, as the bottom diagram of FIG. 9B shows, rather than generating the two AO features in a nested (second) timing feature, the script recognizes that a timing feature of the specified type has already been included in the block diagram, and so generates the two AO features in the previously generated timing feature. Thus, in one embodiment, the script (and/or the application assistant) may execute to generate graphical program features in a context sensitive manner.

In one embodiment, generating the graphical program may include analyzing the user input, and invoking one or more low level assistants to generate the graphical program, where each of the low level application assistants executes a respective one or more scripts to generate respective portions of the graphical program. In other words, the application assistant may include, or may operate in conjunction with, a plurality of other assistants, specifically, lower level assistants, where, for example, each assistant is specific or directed to a particular functional aspect of the application. Said another way, each low level assistant may assist in the scripting or generation of graphical program code for a respective sub-domain of the application assistant's application domain. Thus, the various assistants (including the application assistant) may comprise a hierarchy of assistants. As one example of such a hierarchy, a counter/timer application assistant may include or operate in conjunction with, such low level assistants as an event counter assistant, a quadrature encoding assistant, and a period measurement assistant, among others. Note that these low level assistants are meant to be exemplary only, and are not intended to limit the application assistant or low level assistants to any particular form, function, or organization.

Referring back to the control application example, in one embodiment, the generation of the two LabVIEW diagrams (FPGA and RT of FIGS. 8A and 8B, respectively) may be performed in four steps. First the assistant may generate the FPGA diagram, e.g., using the graphical program features or scripts. The assistant may then generate the RT diagram using the appropriate (presumably different) graphical program features or scripts, but with generic host interface VIs or front panels. In one embodiment, a host interface utility may be provided and used to generate specific host interface VIs or front panels for the FPGA diagram, and another utility may re-link them in the RT diagram.

The resulting FPGA and RT diagrams (see FIGS. 8A and 8B, described above) may thus explicitly represent the division of the application into hardware and software targets. In another embodiment, the assistant may generate a single system level diagram that represents the overall application. This single diagram may be simpler to understand than the explicitly divided diagrams for several reasons. The complete application may be viewed in one diagram instead of spread across two. The explicit communication methods (and corresponding VIs) may be implicit in the single diagram, further simplifying the actual diagram. In one embodiment, an additional tool may generate the two low level diagrams from the system diagram, either automatically or with guidance from the user. Note that the two low level diagrams (FPGA and RT) are what actually get deployed in the application.

Finally, as indicated in 508, the graphical program may optionally be executed to perform the specified functionality. For example, in one embodiment, user input invoking execution of the graphical program may be received, and the graphical program executed, in response to the invoking. As noted above, in one embodiment, at least a portion of the graphical program may be targeted for execution on a programmable hardware element. More generally, in various embodiments, various portions of the graphical program may be targeted to respective different targets, including, for example, computers, such as computer system 82, programmable hardware elements, such as FPGAs, PDAs, embedded systems, such as smart sensors, etc., and/or any other type of target capable of executing graphical program code. For example, different scripts may be created specifically for generating graphical program portions or features for execution on particular targets. Alternatively, scripts may be created that are agnostic with regards to target platforms, but which may be configured or specified, to generate graphical program features for specific targets. In other words, the same script may be configured to generate graphical program code aimed at different targets.

In various embodiments, the application assistant may be operable to generate any of various types of graphical programs. For example, a generated graphical program may be targeted toward a particular graphical programming development environment application, e.g., to utilize proprietary features or to create files that are formatted in a manner expected by the graphical programming development environment. Examples of graphical programming development environments include LabVIEW, BridgeVIEW, DasyLab, and DiaDem from National Instruments, VEE from Hewlett Packard, Simulink from The MathWorks, Softwire from Measurement Computing, Inc., Sanscript from Northwoods Software, WiT from Coreco, and Vision Program Manager from PPT Vision, among others.

In one embodiment, the application assistant may facilitate modification of a previously created block diagram or graphical program. For example, in one embodiment, user input may be received to the GUI specifying import of a previously created graphical program. The previously created graphical program may then be imported in response to the user input specifying the import.

In one embodiment, configuration information for the imported graphical program may be analyzed (programmatically), and the GUI may display respective attributes of the imported graphical program based on the analyzing. In other words, the configuration information may be analyzed and used to populate the graphical interface elements of the GUI with appropriate data. In one embodiment, receiving user input to the GUI specifying the functionality of the graphical program (of step 504 above) may include receiving user input to at least a subset of the graphical interface elements modifying respective attributes of the imported graphical program, where the graphical program comprises the imported graphical program. In other words, the user may then specify desired (new) functionality for the imported graphical program, as described above, where the application assistant then generates the graphical program (i.e., the modified imported graphical program) based on the specified functionality.

Further Embodiments

In some embodiments, the selections made by the user may be verified against any number of different criteria. The criteria may range from trivial to complex, such as, for example, simple range checking and maximum sample rate verification. For range checking, the application assistant may prompt the user to enter a minimum and maximum value for a parameter, and then verify that the entered values are within an acceptable range, e.g., a range feasible for execution. For maximum sample rate verification, various elements of the system, e.g., the selected resources assigned to a timing engine, the timing engine parameters, and/or the specified sample rate, among others, may be analyzed to determine if the system will operate at the desired performance level. In some embodiments, verification may be performed as an explicit step initiated by the user. Alternatively, the verification may be performed automatically by the application assistant at appropriate points in time, e.g., when the user specifies the input, during graphical program generation, and/or when importing a previously generated graphical program, among others. Note that the above described verifications are exemplary only, and in fact, other verifications are envisioned such as verification of the timing for the graphical program, the triggering for the graphical program, the analog input/output (I/O) for the graphical program, the digital input/output (I/O) for the graphical program, the resource allocation for the graphical program, the processing options for execution of the graphical program, and/or the inclusion of one or more external files in the graphical program, among others.

In some embodiments, after generating the graphical program, modification of the graphical program may be desirable. For example, the user may decide that the generated graphical program does not meet all of the application requirements for various reasons, e.g., changing requirements, making incorrect selections in the application assistant, misunderstanding the presented functionality, developing in an iterative fashion, or other causes. In some embodiments, the modification may be made at various points throughout the process, such as after generating the graphical program but prior to exiting the application assistant and/or after generating the graphical program and exiting the application assistant, among others. In these cases, the user may wish to add functionality, e.g., via specifying additional nodes and interconnections, remove functionality, or change functionality of the graphical program. If the user has already exiting the application assistant, the application assistant may be operable to import a previously generated program and subsequently analyze the program to determine the previous settings in the application assistant. Alternatively, if the user has not exited the application assistant, all of the previous settings may still be available to the application assistant. In one embodiment, the user may, then provide further input to the application assistant which may result in the existing graphical program no longer meeting the specified requirements. In various embodiments, the graphical program may be modified or recreated to meet these requirements. For example, in one embodiment, the application assistant may simply generate an entirely new graphical program based on the final configuration specified by the original user input and the further user input. In another embodiment, the application assistant may operate upon the original graphical program, adding, removing, and/or modifying the graphical program as indicated by the further user input.

In some embodiments, similar to above, after generating the graphical program, the user may wish to view the resulting graphical program, and/or make modifications directly to the graphical program. For example, the user may wish to add functionality not available via the application assistant, modify the behavior of portions of the diagram, perform code optimization, and/or specify other modifications. However, in some embodiments, it may be desirable to lock some or all of the graphical program to prevent various modifications. For example, when the application assistant generates the graphical program, it may indicate that portions of the diagram should be locked against modification, typically by tagging the components as "locked" in the graphical program. In some embodiments, when the user opens the graphical program in a suitable editing environment, those portions that are locked may not be modifiable by the user. Note that various types of locks are envisioned, such as, for example, permanent locks that prevent any modifications from being made at any point, locks that require a password for unlocking and modification, locks that may be unlocked via a simple menu selection, requiring no password, and locks that may be unlocked even by simply editing the program, among others. Note that, in some embodiments, before unlocking these portions, the application assistant may still be launched (or re-launched) to edit various aspects of the graphical program, similar to the above descriptions. However, in one embodiment, subsequent to being unlocked, the user may be precluded from invoking the application assistant for a portion or all of the graphical program.

There are a number of different reasons to lock some or all of a diagram. For example, when the lock prevents any modification, the application assistant may be used to simply to view the generated graphical program. Alternatively, the application assistant may lock the generated diagram in order to prevent removal and/or modification of various aspects of the graphical program, but may allow additional code to be added to the diagram. In some embodiments, the application assistant may have a default locking strategy (such as, for example, always locking the generated graphical program to prevent removal or modification without a password), or the locking strategy may be specified by the user of the application assistant, or some combination thereof. Note that the above listed locks and locking strategies are exemplary only, and that further suitable locks and strategies are envisioned.

For example, in one embodiment, locking may refer to the state of the program in reference to the application assistant. More specifically, the application assistant may be available for invocation (or reinvocation) based on whether or not the program and the application assistant are "locked" with respect to each other. In some embodiments, the application assistant and the program may be locked when the code generated by the application assistant has not been substantially modified, e.g., when the code has been changed such that the application assistant cannot interpret the modified code. Note that the user may be able to add further elements, nodes, interconnects, etc., similar to above, without unlocking the application assistant with respect to the program.

In some embodiments, the application assistant may allow the user to specify the use of various resources in the generated graphical program. These resources may include I/O, such as analog inputs, analog outputs, digital lines, etc., memories, processing elements, and timers, among others. The resources may have restrictions on how they may be used, e.g., in what combinations and/or restrictions on how many times they may be used. The application assistant may display the state of the resources so that the user may make appropriate selections. For example, a non-shareable resource may be shown with a simple glyph indicating if it is available or not for selection. For a shareable resource with a limited number of uses, more information may be displayed such as, for example: available, not available, or available but used n times, where n indicates how many times the resource has already been used (or, alternatively, how many times it may still be used). Other possible resource states may include unused, used but available, used and unavailable, e.g., for future use, over-committed and inoperable, invalid, reserved, locked, and disabled, among others. The resource state may be displayed in a variety of ways including glyphs, icons, checkboxes, system diagrams, resource, e.g., dedicated, state display windows, status bars, and more. Each of these various display methods may be launched or displayed during various points of the application assistant process, e.g., during design, execution, or compilation of the graphical program, among others.

Thus, an application assistant may provide significant capabilities to the user, allowing the user to specify functionality of application domain specific graphical programs, such as timing, triggering, and I/O features for applications. As noted above, other application assistants may facilitate configuration or specification of different and/or additional features.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer-accessible non-transitory memory medium that stores program instructions for creating a graphical program, wherein the program instructions are executable by a processor to perform:
    displaying a graphical user interface (GUI) for specifying functionality of a graphical program in an application domain, wherein the GUI corresponds specifically to the application domain, and wherein the GUI comprises a plurality of graphical interface elements operable to indicate and/or specify respective attributes of the graphical program;
    receiving user input to the GUI specifying the functionality of the graphical program, wherein the user input does not specify graphical program nodes or interconnections between graphical program nodes;
    determining a plurality of suitable target devices for the graphical program based on the specified functionality, wherein the graphical program is deployable and executable on each of the suitable target devices to perform the specified functionality;
    the GUI indicating the plurality of suitable target devices;
    receiving user input selecting a plurality of devices from the plurality of suitable target devices for deployment and execution of the graphical program; and
    automatically generating the graphical program in response to the user input, wherein the graphical program is executable to perform the specified functionality, and wherein the graphical program comprises a plurality of interconnected graphical program nodes that visually represents the functionality of the graphical program;
    wherein the graphical program is a distributed graphical program comprising a plurality of portions each targeted for execution on a respective device of the plurality of devices, and wherein the portions are respectively executable on the respective devices to perform the specified functionality in a cooperative manner; and
    wherein at least one of the plurality of devices comprises a programmable hardware element.

2. The computer-accessible non-transitory memory medium of claim 1, wherein the user input to the GUI specifies one or more of:
    timing for the graphical program;
    triggering for the graphical program;
    analog input/output (I/O) for the graphical program;
    digital I/O for the graphical program;
    resource allocation for the graphical program;
    processing options for execution of the graphical program; or
    inclusion of one or more external files in the graphical program.

3. The computer-accessible non-transitory memory medium of claim 2, wherein, in specifying timing for the graphical program, the user input specifies a timing model for the graphical program, and wherein the GUI is operable to display a graphical representation of the timing model in response to the user input.

4. The computer-accessible non-transitory memory medium of claim 2, wherein the program instructions are further executable to perform:
    verifying one or more of:
        the timing for the graphical program specified by the user;
        the triggering for the graphical program specified by the user;
        the analog input/output (I/O) for the graphical program specified by the user;
        the digital input/output (I/O) for the graphical program specified by the user;
        the resource allocation for the graphical program specified by the user;
        the processing options for execution of the graphical program specified by the user; or
        the inclusion of one or more external files in the graphical program specified by the user.

5. The computer-accessible non-transitory memory medium of claim 1, wherein the user input to the GUI specifies the plurality of devices for executing the graphical program, and wherein the program instructions are further executable to perform:
    determining the plurality of graphical interface elements based on the specified plurality of devices, wherein the plurality of graphical interface elements correspond to respective attributes of the graphical program appropriate to each of the plurality of devices.

6. The computer-accessible non-transitory memory medium of claim 1, wherein the program instructions are further executable to perform:
    storing configuration information for the graphical program in one or more of:
        a configuration file; and
        the graphical program.

7. The computer-accessible non-transitory memory medium of claim 6, wherein the graphical program comprises one or more features, wherein each of the one or more features comprises a respective one or more graphical program elements; and wherein the configuration information specifies the graphical program at a feature level.

8. The computer-accessible non-transitory memory medium of claim 1, wherein the program instructions are further executable to perform:

receiving user input to the GUI specifying import of a previously created graphical program; and importing the previously created graphical program in response to the user input specifying the import.

9. The computer-accessible non-transitory memory medium of claim 8, wherein the program instructions are further executable to perform:

analyzing configuration information for the imported graphical program; and the GUI displaying respective attributes of the imported graphical program based on said analyzing configuration information;

wherein said receiving user input to the GUI specifying the functionality of the graphical program comprises receiving user input to at least a subset of the graphical interface elements modifying respective attributes of the imported graphical program; and wherein said automatically generating comprises automatically modifying the imported graphical program based on the received user input, and wherein the graphical program comprises the modified imported graphical program.

10. The computer-accessible non-transitory memory medium of claim 1, wherein the application domain comprises one or more of:

control loops;
timer/counters;
control;
motion control;
measurement;
data acquisition;
waveform generation;
pattern matching;
data analysis;
image processing;
signal processing;
machine vision;
hardware in the loop simulation;
simulation; or
embedded systems.

11. The computer-accessible non-transitory memory medium of claim 1, wherein said automatically generating the graphical program comprises:

automatically analyzing the user input; and
automatically executing one or more scripts to generate the graphical program based on the analysis.

12. The computer-accessible non-transitory memory medium of claim 11, wherein said executing one or more scripts to generate the graphical program comprises:

invoking one or more low level assistants to generate the graphical program, wherein each of the low level application assistants executes a respective one or more scripts to generate respective portions of the plurality of portions of the graphical program.

13. The computer-accessible non-transitory memory medium of claim 11, wherein said automatically generating the graphical program further comprises:

automatically generating the one or more scripts based on the analysis.

14. The computer-accessible non-transitory memory medium of claim 1, wherein the program instructions are further executable to perform:

receiving further user input specifying one or more additional nodes and/or interconnections for the graphical program; and adding the one or more additional nodes and/or interconnections to the graphical program in response to the further user input.

15. The computer-accessible non-transitory memory medium of claim 14, wherein the program instructions are further executable to perform:

receiving additional user input invoking the GUI;

displaying a graphical user interface (GUI) for specifying further functionality of a graphical program in an application domain, wherein the GUI corresponds specifically to the application domain;

receiving user input to the GUI further specifying the functionality of the graphical program; and generating an updated graphical program in response to the user input.

16. The computer-accessible non-transitory memory medium of claim 1, wherein the program instructions are further executable to perform:

receiving further user input specifying modification of the graphical program; and modifying the graphical program in response to the further user input.

17. The computer-accessible non-transitory memory medium of claim 1, wherein the program instructions are further executable to perform:

receiving further user input specifying one or more modifications to the plurality of interconnected nodes of the generated graphical program; and modifying the plurality of interconnected nodes in response to the further user input.

18. The computer-accessible non-transitory memory medium of claim 17, wherein, prior to said receiving further user input specifying one or more modifications and said modifying the plurality of interconnected nodes, the graphical program is locked with respect to the GUI, wherein, in being locked with respect to the GUI allows the GUI to be invoked for the graphical program; and wherein said modifying the plurality of interconnected nodes further comprises:

unlocking the graphical program with respect to the GUI, wherein said unlocking precludes subsequently invoking the GUI for the graphical program.

19. The computer-accessible non-transitory memory medium of claim 1, wherein the GUI is operable to display resource states of respective resources associated with the graphical program.

20. The computer-accessible non-transitory memory medium of claim 19, wherein the resource states comprise one or more of:

unused;
used but available;
used and unavailable for further use; or
over-committed and inoperable.

21. The computer-accessible non-transitory memory medium of claim 20, wherein if the resource state is used and unavailable for further use, the GUI is operable to lock the resource against further use.

22. The computer-accessible non-transitory memory medium of claim 19, wherein the GUI is operable to display resource states via one or more of:
- one or more icons associated with the respective resource;
- a resource state display window;
- a system diagram;
- one or more status bars associated with the corresponding resources; and
- a display window launched during compilation or execution of the graphical program.

23. The computer-accessible non-transitory e memory medium of claim 1, wherein said receiving user input to the GUI comprises:
- executing one or more assistants to receive further user input specifying additional functionality of the graphical program.

24. The computer-accessible non-transitory memory medium of claim 1, wherein said generating the graphical program further comprises:
- automatically analyzing the user input;
- automatically generating one or more data structures based on the analysis; and
- automatically generating the graphical program based on the one or more data structures.

25. The computer-accessible non-transitory memory medium of claim 1, wherein at least one of the plurality of devices comprises a host computer.

26. The computer-accessible non-transitory memory medium of claim 1, wherein the GUI is operable to display an estimated utilization of one or more of the at least one programmable hardware element.

27. The computer-accessible non-transitory memory medium of claim 1, wherein the GUI is further operable to perform:
- displaying the graphical program.

28. The computer-accessible non-transitory memory medium of claim 1,
- wherein the GUI is further operable to perform:
  - receiving user input specifying deployment of the graphical program to the plurality of devices; and
- wherein the program instructions are further executable to perform:
  - deploying the graphical program to the plurality of devices in response to said receiving user input specifying deployment of the graphical program.

29. The computer-accessible non-transitory memory medium of claim 28, wherein the program instructions are further operable to perform:
- receiving user input invoking execution of the graphical program; and
- executing the graphical program on the plurality of devices in response to said invoking.

30. A computer-implemented method for creating a graphical program, the method comprising:
- utilizing a computer to perform:
  - displaying a graphical user interface (GUI) for specifying functionality of a graphical program in an application domain, wherein the GUI corresponds specifically to the application domain, and wherein the GUI comprises a plurality of graphical interface elements operable to indicate and/or specify respective attributes of the graphical program;
  - receiving user input to the GUI, wherein the user input specifies the functionality of the graphical program, wherein the user input does not specify graphical program nodes or interconnections between graphical program nodes;
  - determining a plurality of suitable target devices for the graphical program based on the specified functionality, wherein the graphical program is deployable and executable on each of the suitable target devices to perform the specified functionality;
  - the GUI indicating the plurality of suitable target devices;
  - receiving user input selecting a plurality of devices from the plurality of suitable target devices for deployment and execution of the graphical program; and
  - automatically generating the graphical program in response to the user input, wherein the graphical program is executable to perform the specified functionality, and wherein the graphical program comprises a plurality of interconnected graphical program nodes that visually represents the functionality of the graphical program;
  - wherein the graphical program is a distributed graphical program comprising a plurality of portions each targeted for execution on a respective device of a plurality of devices, and wherein the portions are respectively executable on the respective devices to perform the specified functionality in a cooperative manner; and
  - wherein at least one of the plurality of devices comprises a programmable hardware element.

31. A system for creating a graphical program, the system comprising:
- a processor;
- a memory, coupled to the processor; and
- a display device, coupled to the processor and the memory;
- wherein the memory stores program instructions which are executable by the processor to:
  - display a graphical user interface (GUI) on the display device for specifying functionality of a graphical program in an application domain, wherein the GUI corresponds specifically to the application domain;
  - receive user input to the GUI, wherein the user input specifies the functionality of the graphical program, wherein the user input does not specify graphical program nodes or interconnections between graphical program nodes; and
  - determining a plurality of suitable target devices for the graphical program based on the specified functionality, wherein the graphical program is deployable and executable on each of the suitable target devices to perform the specified functionality;
  - the GUI indicating the plurality of suitable target devices;
  - receiving user input selecting a plurality of devices from the plurality of suitable target devices for deployment and execution of the graphical program;
  - automatically generating the graphical program in response to the user input, wherein the graphical program is executable to perform the specified functionality, and wherein the graphical program comprises a plurality of interconnected graphical program nodes that visually represents the functionality of the graphical program;
  - wherein the graphical program is a distributed graphical program comprising a plurality of portions each targeted for execution on a respective device of a plurality of devices, and wherein the portions are respectively executable on the respective devices to perform the specified functionality in a cooperative manner; and wherein at least one of the plurality of devices comprises a programmable hardware element.

32. A system for creating a graphical program, the system comprising:

means for displaying a graphical user interface (GUI) for specifying functionality of a graphical program in an application domain, wherein the GUI corresponds specifically to the application domain, and wherein the GUI comprises a plurality of graphical interface elements operable to indicate and/or specify respective attributes of the graphical program;

means for receiving user input to the GUI, wherein the user input specifies the functionality of the graphical program, wherein the user input does not specify graphical program nodes or interconnections between graphical program nodes;

means for determining a plurality of suitable target devices for the graphical program based on the specified functionality, wherein the graphical program is deployable and executable on each of the suitable target devices to perform the specified functionality;

means for the GUI indicating the plurality of suitable target devices;

means for receiving user input selecting a plurality of devices from the plurality of suitable target devices for deployment and execution of the graphical program; and means for automatically generating the graphical program in response to the user input, wherein the graphical program is executable to perform the specified functionality, and wherein the graphical program comprises a plurality of interconnected graphical program nodes that visually represents the functionality of the graphical program;

wherein the graphical program is a distributed graphical program comprising a plurality of portions each targeted for execution on a respective device of a plurality of devices, and wherein the portions are respectively executable on the respective devices to perform the specified functionality in a cooperative manner; and wherein at least one of the plurality of devices comprises a programmable hardware element.

\* \* \* \* \*